US012613960B1

(12) United States Patent
Devnath et al.

(10) Patent No.: US 12,613,960 B1
(45) Date of Patent: Apr. 28, 2026

(54) NETWORK BASED SIDE CHANNEL ATTACK (SCA) DETECTION

(71) Applicant: CEREMORPHIC, INC., San Jose, CA (US)

(72) Inventors: Joydeep Kumar Devnath, Guwahati (IN); Ananya Shrivastava, Durg (IN); Arpan Manna, Kolkata (IN); Chandrajit Pal, Behala (IN); Mohammed Sumair, Almora (IN); Suyash Kandele, Bhilai (IN); Govardhan Mattela, Hyderabad (IN)

(73) Assignee: Ceremorphic, Inc., San Jose, CA (US)

( * ) Notice: Subject to any disclaimer, the term of this patent is extended or adjusted under 35 U.S.C. 154(b) by 886 days.

(21) Appl. No.: 17/750,362

(22) Filed: May 22, 2022

(51) Int. Cl.
*G06F 21/55* (2013.01)
*H04L 9/00* (2022.01)

(52) U.S. Cl.
CPC ............ *G06F 21/556* (2013.01); *H04L 9/003* (2013.01)

(58) Field of Classification Search
CPC ............................... G06F 21/556; H04L 9/003
See application file for complete search history.

(56) References Cited

U.S. PATENT DOCUMENTS

| | | | | | |
|---|---|---|---|---|---|
| 8,892,903 | B1 * | 11/2014 | Trimberger | ........... | G06F 21/755 |
| | | | | | 713/189 |
| 11,824,986 | B2 * | 11/2023 | Guilley | ................... | H04L 9/004 |
| 12,147,528 | B2 * | 11/2024 | Calciu | ................. | G06F 12/0891 |
| 2005/0152539 | A1 * | 7/2005 | Brickell | .................. | G06F 7/723 |
| | | | | | 380/28 |
| 2007/0019805 | A1 * | 1/2007 | Karpovsky | ........... | H04L 9/0618 |
| | | | | | 380/28 |
| 2008/0059711 | A1 * | 3/2008 | McKeen | ................. | G06F 21/79 |
| | | | | | 711/E12.098 |
| 2011/0228926 | A1 * | 9/2011 | Shumow | ................ | H04L 9/003 |
| | | | | | 380/1 |
| 2018/0012020 | A1 * | 1/2018 | Prvulovic | ............ | G06F 21/552 |
| 2019/0042453 | A1 * | 2/2019 | Basak | ................... | G06F 12/128 |
| 2020/0034538 | A1 * | 1/2020 | Woodward | ........... | G06F 21/566 |
| 2022/0207146 | A1 * | 6/2022 | Rozas | ................... | G06F 21/577 |
| 2023/0092190 | A1 * | 3/2023 | Homayoun | ............ | G06N 20/00 |
| | | | | | 726/26 |

(Continued)

*Primary Examiner* — Rupal Dharia
*Assistant Examiner* — Devin E Almeida
(74) *Attorney, Agent, or Firm* — File-EE-Patents.com; Jay A. Chesavage

(57) ABSTRACT

Some embodiments include a method for detecting and interrupting a cache-based side-channel attack. The method includes: (1) at least calibrating one or more chiplets of a network by calculating a threshold; (2) determining one or more device heartbeat vectors of the one or more chiplets, the one or more device heartbeat vectors being derived at least part from one or more measurements of activity of one of more dedicated security processors associated with the one or more chiplets; (3) determining that a particular chiplet of the one or more chiplets is being attacked with a cache-based side-channel attack, the determining being based at least in part on a computed disparity exceeding the threshold; and (4) employing countermeasures against the cache-based side-channel attack of the particular chiplet, the countermeasures including revoking one or more access rights of the particular chiplet on the network.

17 Claims, 18 Drawing Sheets

(56)          References Cited

U.S. PATENT DOCUMENTS

| | | | |
|---|---|---|---|
| 2023/0155845 A1* | 5/2023 | Marson | H04L 9/3218 |
| | | | 713/189 |
| 2023/0222229 A1* | 7/2023 | Schwaderer | H04L 9/0668 |
| | | | 726/26 |
| 2023/0259618 A1* | 8/2023 | Veshchikov | G06F 21/75 |
| | | | 726/23 |

* cited by examiner

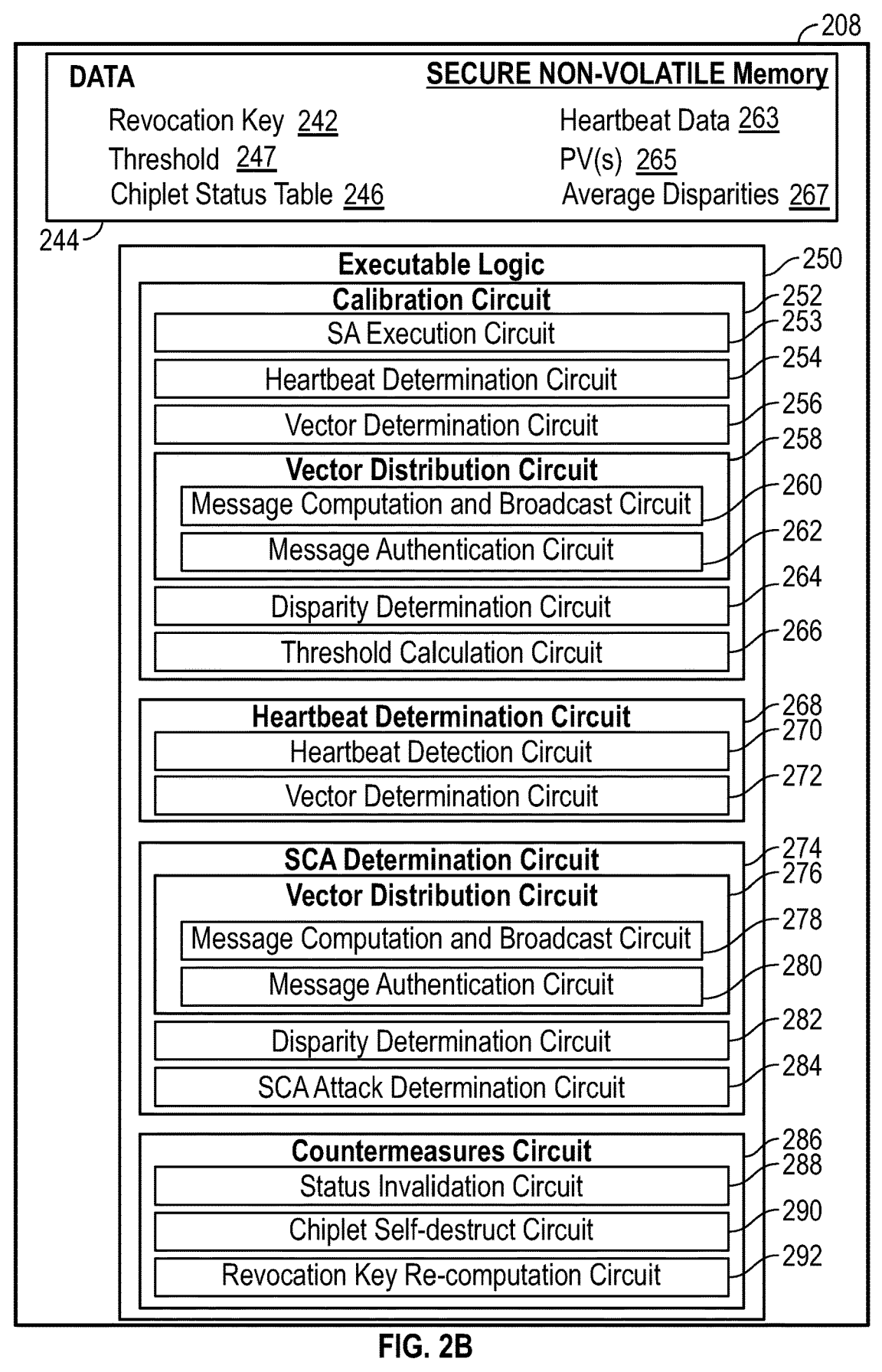

208

DATA  SECURE NON-VOLATILE Memory

Revocation Key 242                  Heartbeat Data 263
Threshold 247                       PV(s) 265
Chiplet Status Table 246            Average Disparities 267

244

Executable Logic 250

Calibration Circuit 252

SA Execution Circuit 253

Heartbeat Determination Circuit 254

Vector Determination Circuit 256

Vector Distribution Circuit 258

Message Computation and Broadcast Circuit 260

Message Authentication Circuit 262

Disparity Determination Circuit 264

Threshold Calculation Circuit 266

Heartbeat Determination Circuit 268 270

Heartbeat Detection Circuit

Vector Determination Circuit 272

SCA Determination Circuit 274 276

Vector Distribution Circuit

Message Computation and Broadcast Circuit 278

Message Authentication Circuit 280

Disparity Determination Circuit 282

SCA Attack Determination Circuit 284

Countermeasures Circuit 286 288

Status Invalidation Circuit

Chiplet Self-destruct Circuit 290

Revocation Key Re-computation Circuit 292

FIG. 2B

Portion of 150 × 5 Matrix

Chiplet 1 Communicating the Values

$$d_4 \xleftarrow{AV} \begin{cases} dist_{41} = \text{Squared L2 norm } (PV_4, PV_1) \\ dist_{42} = \text{Squared L2 norm } (PV_4, PV_2) \\ dist_{43} = \text{Squared L2 norm } (PV_4, Pv_3) \end{cases}$$

$$d_1 \xleftarrow{AV} \begin{cases} dist_{12} = \text{Squared L2 norm } (PV_1, PV_2) \\ dist_{13} = \text{Squared L2 norm } (PV_1, PV_3) \\ dist_{14} = \text{Squared L2 norm } (PV_1, Pv_4) \end{cases}$$

$$d_2 \xleftarrow{AV} \begin{cases} dist_{23} = \text{Squared L2 norm } (PV_2, PV_3) \\ dist_{24} = \text{Squared L2 norm } (PV_2, PV_4) \\ dist_{21} = \text{Squared L2 norm } (PV_2, Pv_1) \end{cases}$$

$$d_3 \xleftarrow{AV} \begin{cases} dist_{32} = \text{Squared L2 norm } (PV_3, PV_2) \\ dist_{34} = \text{Squared L2 norm } (PV_3, PV_4) \\ dist_{31} = \text{Squared L2 norm } (PV_3, Pv_1) \end{cases}$$

$n(n-1) \rightarrow$ Number of PV Pairs $\dfrac{n(n-1)}{2} \rightarrow$ Number of Computed Distances

$d_x > T$ = Attacked Chiplet

FIG. 5C

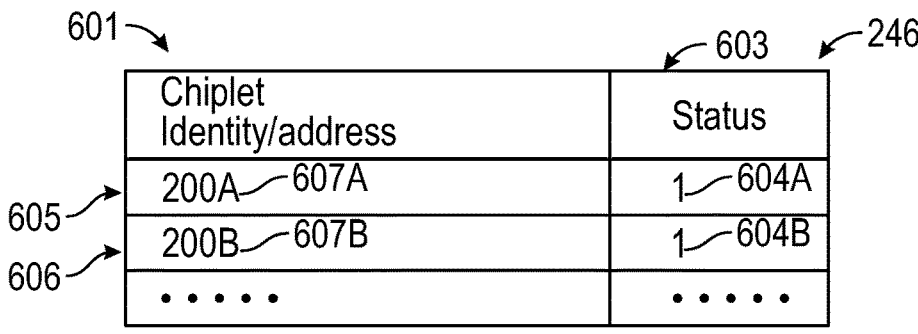

Calibration Step

| SET | AES Iterations | |
|-----|------|------|
| 1 | 10 | d1 |
| 2 | 10000 | d2 |
| 3 | 30000 | d3 |
| 4 | 48000 | d4 |
| 5 | 50000 | d5 |

} MAX $$\text{Threshold} = \text{Max} (d1, d2, d3, d4, d5) * (1+\Delta)$$

$$\text{Where } \Delta \text{ is in Range of } (0,1)$$

750

Table : Detection Results

| Δ | Time Instant | Avg. Distance of Attacker | Detection of Attack | Time of Detection (In ms) |
|---|---|---|---|---|
| 0 | 19999 | 994.67603423453 76 | ✓ | 7.35 |
| 0.05 | 19999 | 994.67603423453 76 | ✓ | 7.35 |
| 0.1 | 20002 | 1325.0959196399 44 | ✓ | 7.8 |

1400

1402  1404  1408  1410

1406

1420  1422  1424

1500

1510 — Calibration

1540 — Heartbeat vector determination

1560 — SCA detection

1580 — Countermeasures

1500

1510 — Calibration

1511 — Execute SA

1512 — Detect Heartbeats

1514 — Determine Vectors

1516 — Distribute Vectors

1518 — Send Messages

1520 — Authenticate Messages

1522 — Determine Disparities

1524 — Calculate Threshold

1540 — Heartbeat Determination

1560 — SCA Detection

1580 — Countermeasures

1500

NETWORK BASED SIDE CHANNEL ATTACK (SCA) DETECTION

FIELD OF TECHNOLOGY

Some embodiments pertain to systems and methods for detecting and defeating a cache-based side-channel attack in a network of resource-constrained devices, for example chiplets. In particular some embodiments pertain to systems and methods for detecting and defeating a cache-based side-channel attack in a network of resource-constrained devices, for example chiplets, by monitoring and processing device heartbeats and if a side-channel attack is detected, launching countermeasures.

BACKGROUND

A side-channel attack (SCA) is an attack based on information leaked by operation of a computer system itself, rather than being based on a software or algorithm weakness. There are different types of SCA's. One broad category of SCA's is a cache-based side-channel attack (cache-based SCA). A cache-based SCA attacks the cache memory of a processor (e.g. a CPA). Sensitive information, such as cryptographic passwords may be processed by a processor utilizing its cache memory. A cache-based SCA attempts to exploit that processing.

Some cache-based SCA's are the following:
Flush+Reload
Flush+Flush
Prime+Probe
Prime+Abort
Evict+Time
Evict+Reload The consequences of a successful cache-based SCA may be a compromise of a cryptographic password, a serious security breach that can have catastrophic consequences, such as loss of trade secrets, theft of financial information, loss of control of the compromised computing system, and other consequences. A challenge in detecting a cache-based SCA program before it has succeeded is that cache-based SCA programs run as normal programs in the CPU and it is difficult for malware programs to detect them. One program, Spectre, affects processors that perform branch prediction. The branch prediction may leave clues to private data in a processor cache, a weakness that Spectre exploits through an side-channel attack. Another program is Meltdown, which affects a broad array of processors. Meltdown also uses a side-channel attack to complete its attack. Both Spectre and Meltdown are difficult for malware to detect because they begin by attacking vulnerabilities in the hardware implementation of state-of-the-art CPU's.

While there are approaches to detecting cache-based SCA, existing approaches tend to use resource-intensive methodologies. For example, some approaches use machine-learning (ML) and neural-network models which requiring high-performance compute preprocessing to retrieve final features and which involve storage of weight matrices, use of matrix multiplication, and/or use of non-linear functions. See: Mushtaq, Maria, et al. "Machine learning for security: The case of side-channel attack detection at run-time." 2018 25th IEEE International Conference on Electronics, Circuits and Systems (ICECS). IEEE, 2018.; Wang, Han, et al. "Scarf: Detecting side-channel attacks at real-time using low-level hardware features." 2020 IEEE 26th International Symposium on On-Line Testing and Robust System Design (IOLTS). IEEE, 2020; Wang, Han, et al. "Comprehensive evaluation of machine learning countermeasures for detecting microarchitectural side-channel attacks." Proceedings of the 2020 on Great Lakes Symposium on VLSI. 2020; Mushtaq, Maria, et al. "Nights-watch: A cache-based side-channel intrusion detector using hardware performance counters." Proceedings of the 7th International Workshop on Hardware and Architectural Support for Security and Privacy, 2018."

Once an SCA is detected, counter measures include:

a. Constant-time techniques. These approaches attempt to make operations (such as cache memory access) time constant. These approaches are difficult to implement due to hardware complexity and are also platform-dependent. See: Lyu, Yangdi, and Prabhat Mishra. "A survey of side-channel attacks on caches and counter-measures." Journal of Hardware and Systems Security 2.1 (2018): 33-50."

b. Compiler techniques. These approaches insert extra noise and randomization in cryptographic algorithms to decrease time variation. There is a trade-off between security and performance. Yangdi Lyu (2017).

c. OS level countermeasures such as restricting fine-grained time measurements. These approaches are either impractical or insufficient. Some of these approaches require an addition of real delay in a system, showing slight slowdown in performance.

d. Preventing physical memory sharing with tools such as CacheBar. This approach is useful, especially for cloud applications, but requires kernel code changes (additional lines of code). Yangdi Lyu (2017) reports that this approach slows response time of Apache 24.7 web server, including increasing delay by 20%, degrading throughput by 25%, and introducing 2-15% overhead.

e. Cache flushing techniques. These approaches come with performance overheads of 7-15%. Yangdi Lyu (2017).

f. Cache partitioning tools, such as Cache coloring. These are effective mechanisms to defend against parallel side channels. Yangdi Lyu (2017). However, experimental results show that while selective cache flushing is effective to defend sequential side channels, it introduces a 15% overhead when testing Apache benchmark. Cache coloring-based cache partition is effective for parallel side channels and the overhead is dependent on the number of partitions and can go up to 30%.

g. Randomization. This approach is used to obfuscate cache-access patterns. It introduces an extra permutation table associated with the cache (the whole system is called RPCache). Yangdi Lyu (2017). Although this approach has low overhead, there is no fabricated hardware using RPCache. One example is address space layout randomization (ASLR). ASLR works at the virtual memory management level to randomize the locations of different parts of the program in primary memory every time the program is run. But there are some attacks shown in the literature that can bypass ASLR. For example, Hund R, Willems C, Holz T (2013) Practical timing side channel attacks against kernel space ASLR. In: 2013 IEEE symposium on security and privacy, pp 191-205.

h. Machine Learning Techniques. Maria Mushtaq (2018) has proposed 12 ML models for detecting cache-based SCAs in Intel's x86 architecture. They have experimentally shown that ML models can achieve around 90% accuracy for Flush+Reload on RSA and Flush+Flush on AES. Han Wang (September 2020) has proposed 6 different ML models (Naive Bayes, MLP, SGD, IBK, OneR and J48) and their accuracy ranges from 65% to 93% when hardware performance counters (HPC's) collected data at sampling rate of 50 μs. They have also shown that increasing sampling rate from 50 μs to 100 μs can improve the accuracy up to 20% for Naive Bayes.

The above approaches are not ideal for resource-constrained devices, such as chiplets.

A chiplet is an integrated circuit that is designed to be part of a larger whole. In some implementations, a chiplet is an independent unit for processing and computing. A chiplet may be a part of a package. In some implementations, a package may contain multiple homogenous or identical chiplets. A package may contain multiple heterogenous chiplets. A chiplet may also contain one or more sub-chiplets. A sub-chiplet is a dedicated hardware for a specific purpose, such as for example, an artificial intelligence engine, a machine learning (ML) engine, a communication circuit, or other fixed purpose. A chiplet may also be part of a larger integrated circuit, such as a computer processor.

Recently chiplets are part of a trend toward modular design of processors and other large integrated circuits. One reason for this is reduced cost if there is a defect. If there is a defect in a monolithic computer processor, the entire computer processor may have to be discarded. In contrast if there is a defect is a chiplet that forms part of a modular computer processor, only that one defective chiplet need be discarded.

Chiplets may also be part of a network. For example two or more chiplets on a package may form a network in which they communicate over one or more communication channels. One design consideration for chiplet networks is security, including security from cache-based SCAs. One challenge for securing chiplet networks is that chiplets are resource-constrained devices. Chiplets are resource-constrained in at least one of computing power, memory resources, or power supply.

Because chiplets are resource-constrained, there is a need to provide lightweight technologies and methods for detecting and defeating cache-based SCA's. Lightweight technologies and methods are those that require at least one of fewer computer power, fewer memory resources, or less electrical power compared to a device that is not resource-constrained, such as for example, a server, a cloud computer, or a desktop computer.

SUMMARY

Some embodiments include a method for detecting and interrupting a cache-based side-channel attack performed with a network of chiplets. The method includes at least calibrating one or more chiplets of the network of chiplets by at least calculating a threshold, the threshold being calculated dependent upon at least a type of security algorithm being executed by the one or more of the chiplets.

The method further includes determining one or more device heartbeat vectors of the one or more chiplets, the one or more device heartbeat vectors being derived at least part from one or more measurements of activity of one of more dedicated security processors associated with the one or more chiplets.

The method further includes determining that a particular chiplet of the one or more chiplets is being attacked with a cache-based side-channel attack, the determining being based at least in part on a computed disparity exceeding the threshold, the computed disparity being computed based at least in part on one or more disparities between at least one or more device heartbeat vectors associated with the particular chiplet and one or more other device heartbeat vectors associated with others of the one or more chiplets.

And the method further includes employing countermeasures against the cache-based side-channel attack of the particular chiplet, the countermeasures including at least revoking one or more access rights of the particular chiplet on the network.

BRIEF DESCRIPTION OF THE DRAWINGS

Representative embodiments are illustrated by way of example and not by limitation in the accompanying figures, in which:

FIG. 2B is a simplified block diagram of an exemplary secure non-volatile memory, consistent with some embodiments, showing the memory storing data and executable code.

FIG. 5C is a diagram illustrating a process for computing disparities in the network of chiplets of FIG. 3, in accordance with some embodiments.

FIG. 6A is a diagram of a revocation table stored in memory of a chiplet, in accordance with some embodiments, showing valid status of two exemplary chiplets.

FIG. 6B is a diagram of a revocation table of FIG. 6A, in accordance with some embodiments, showing an exemplary chiplet having a status of zero, which is revoked.

data collected from a chiplet, with the top row of tables showing LLC-loads activity that is indicative of a cache-based SCA and the bottom row of tables showing LLC-loads activity that is not indicative of an attack.

Figure 10:
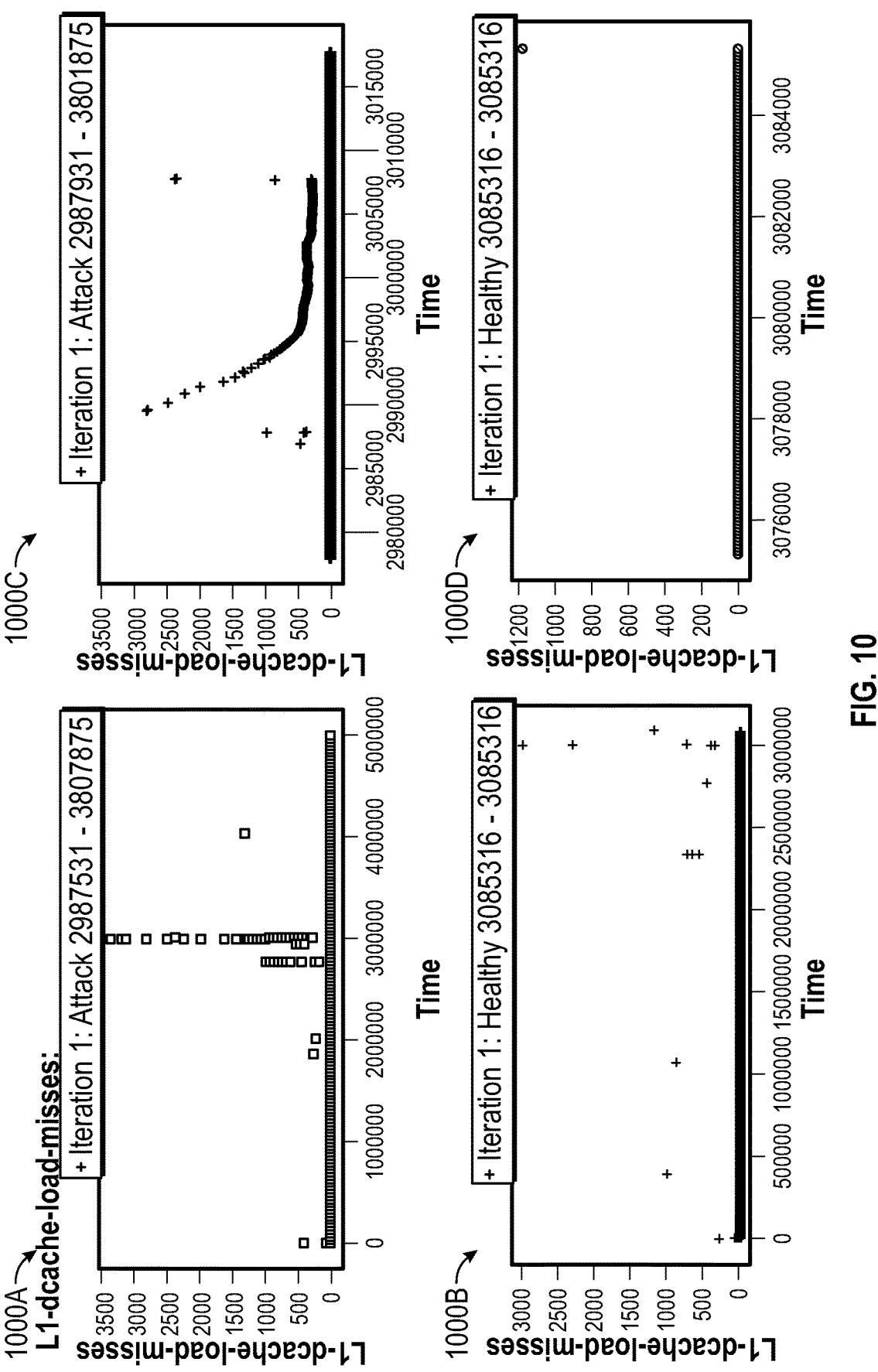

FIG. 10 is a collection of tables, consistent with some embodiments, showing L1-dcache-load-misses data collected from a chiplet, with the top row of tables showing L1-dcache-load-misses data that is indicative of a cache-based SCA and the bottom row of tables showing L1-dcache-load-misses data that is not indicative of an attack.

Figure 11:
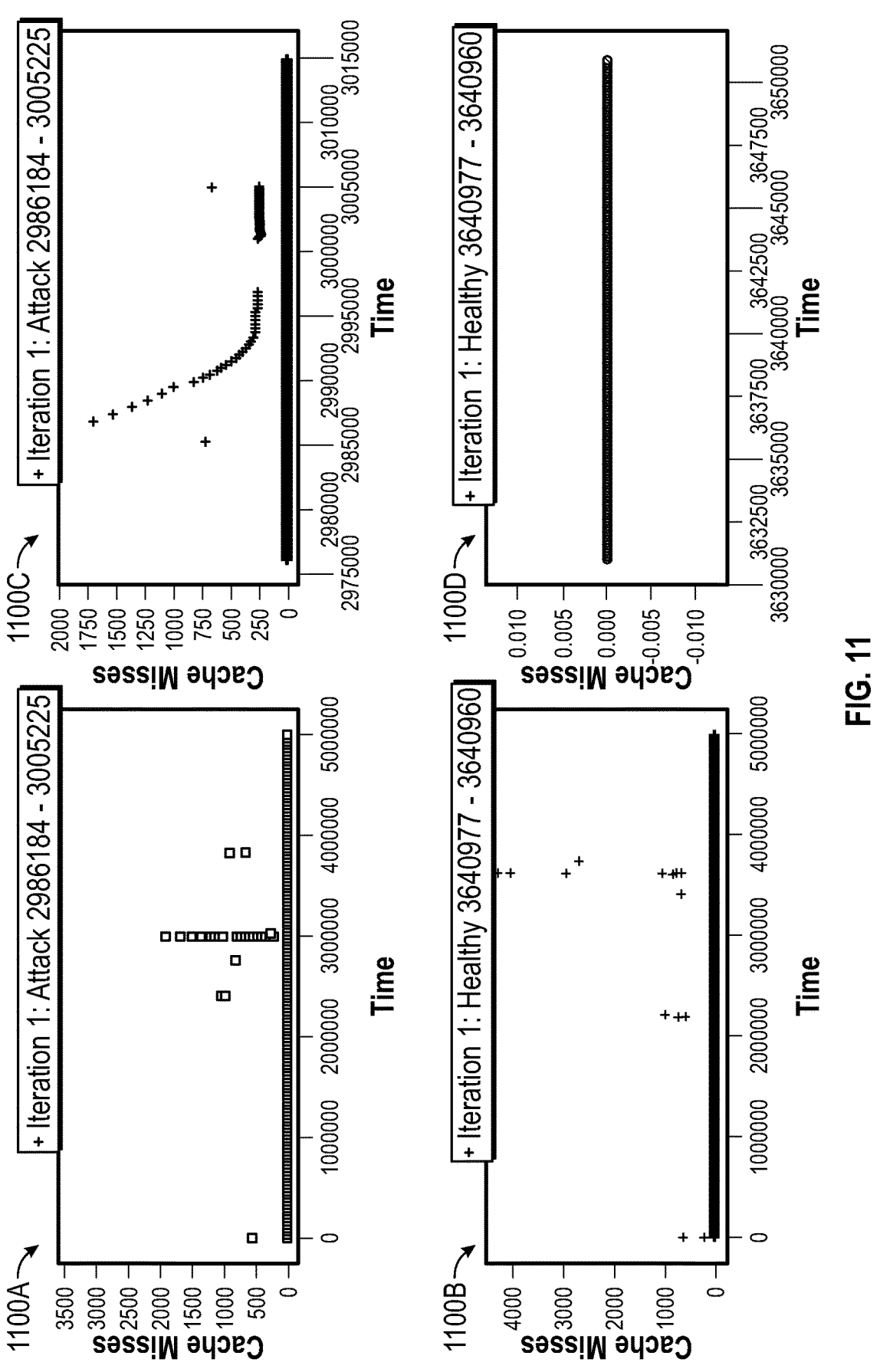

FIG. 11 is a collection of tables, consistent with some embodiments, showing cache miss data collected from a chiplet, with the top row of tables showing cache-misses data that is indicative of a cache-based SCA and the bottom row of tables showing cache miss data that is not indicative of an attack.

Figure 12:
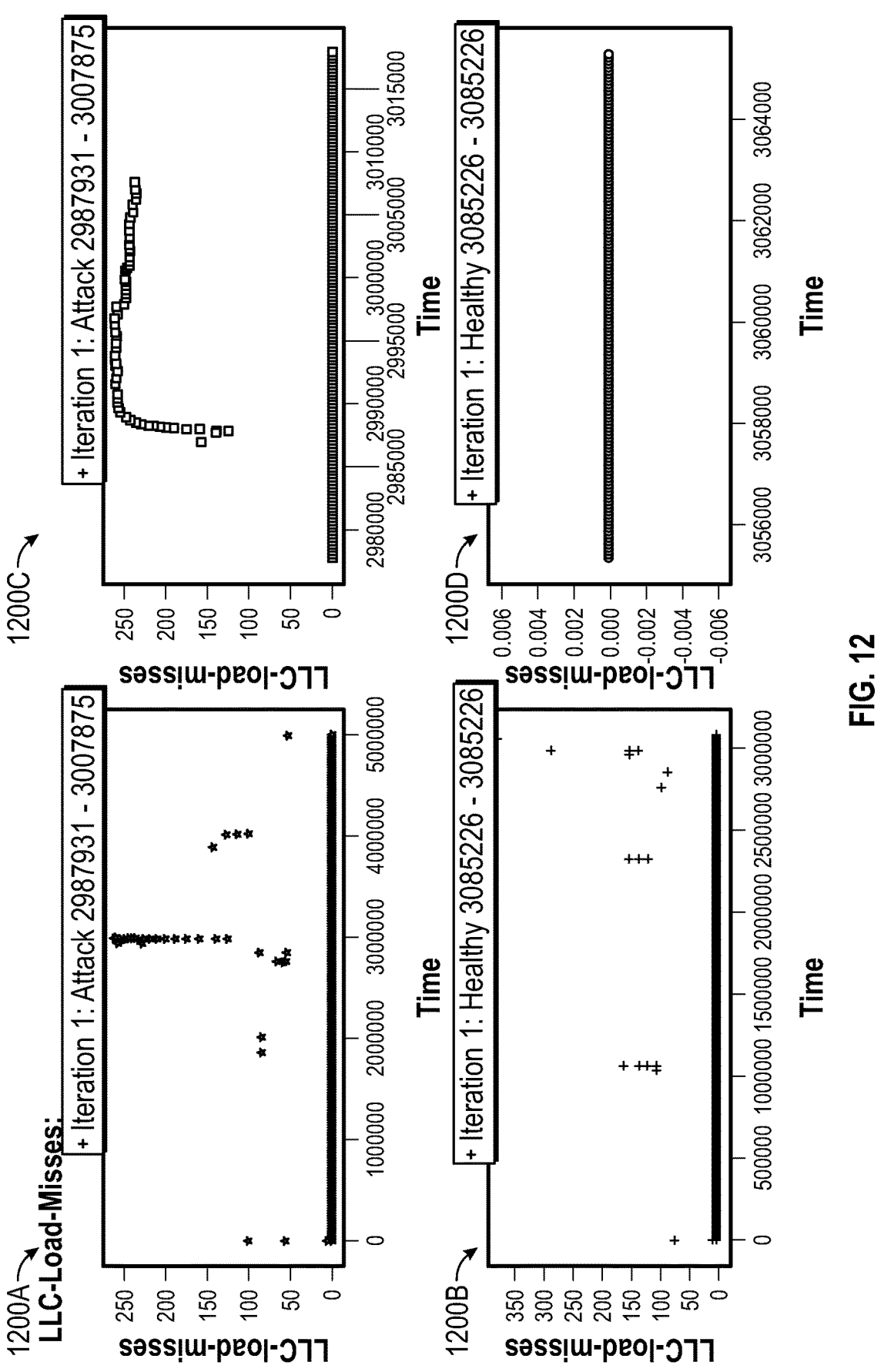

FIG. 12 is a collection of tables, consistent with some embodiments, showing LLC-load-misses data collected from a chiplet, with the top row of tables showing LLC-load misses data that is indicative of a cache-based SCA and the bottom row of tables showing LLC-load-misses data that is not indicative of an attack.

Figures 13A, 13B:
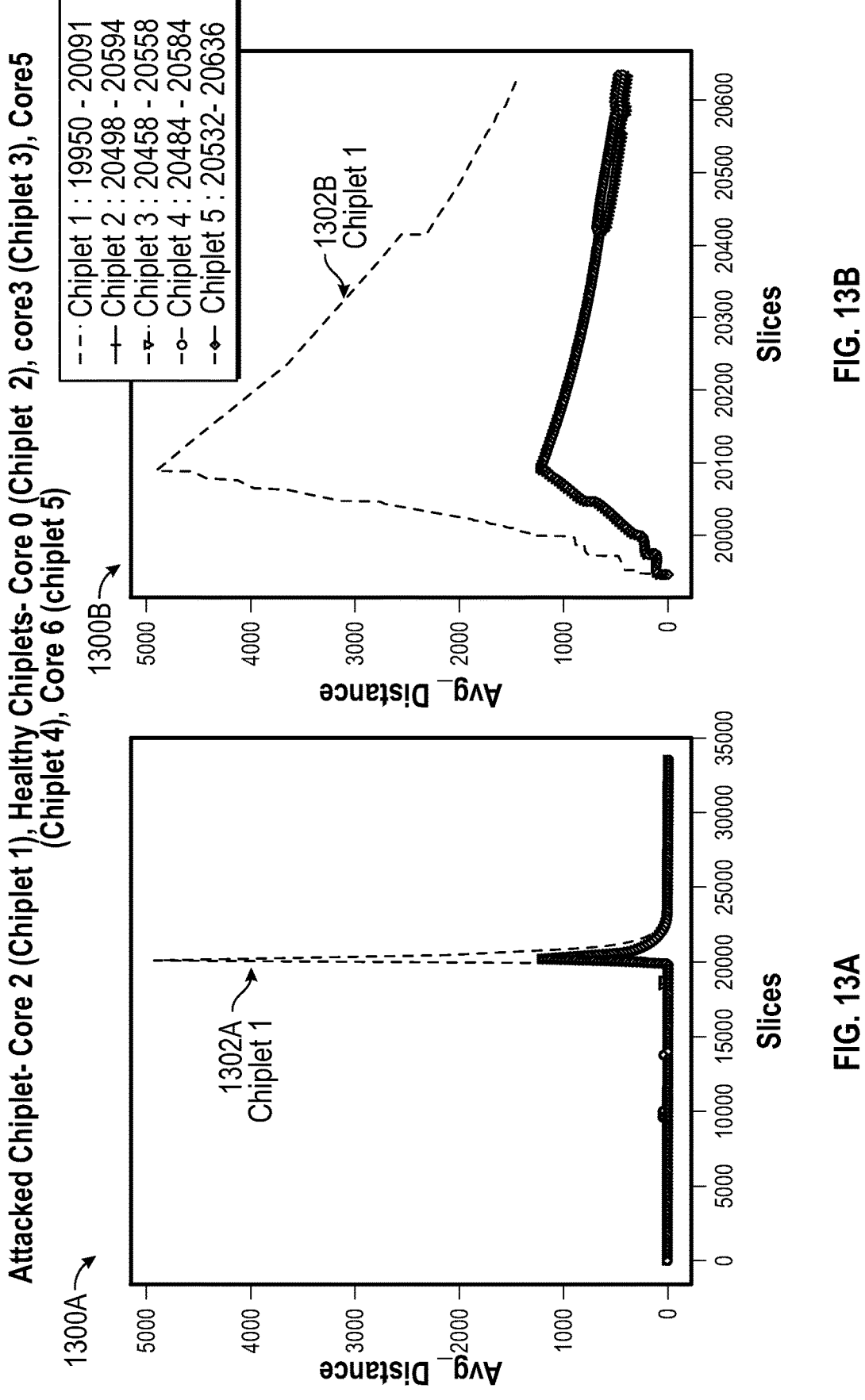

FIGS. 13A and 13B are graphs of test results, consistent with some embodiments, showing distances between chiplets (modeled by cores) on various metrics across a range of time slices and the detection of a compromised core (chiplet). FIG. 13A provides a broad view of activity across all time slices whereas FIG. 13B a focused view of activity during a subset of time slices in which the attack occurs.

Figure 14:
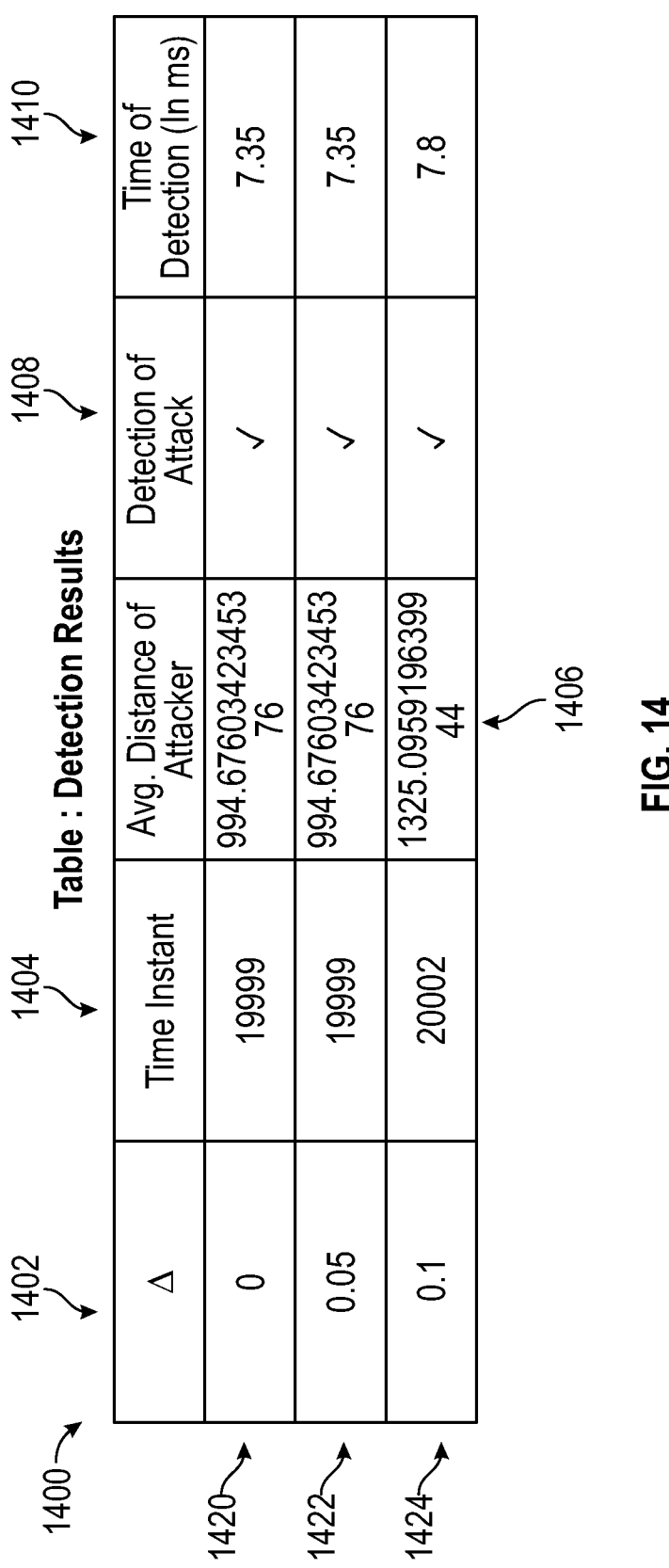

FIG. 14 is a table, consistent with some embodiments, showing statistics for detection of a cache-based SCA, the statistics being from the test results of FIGS. 13A and 13B.

Figures 15A, 15B:
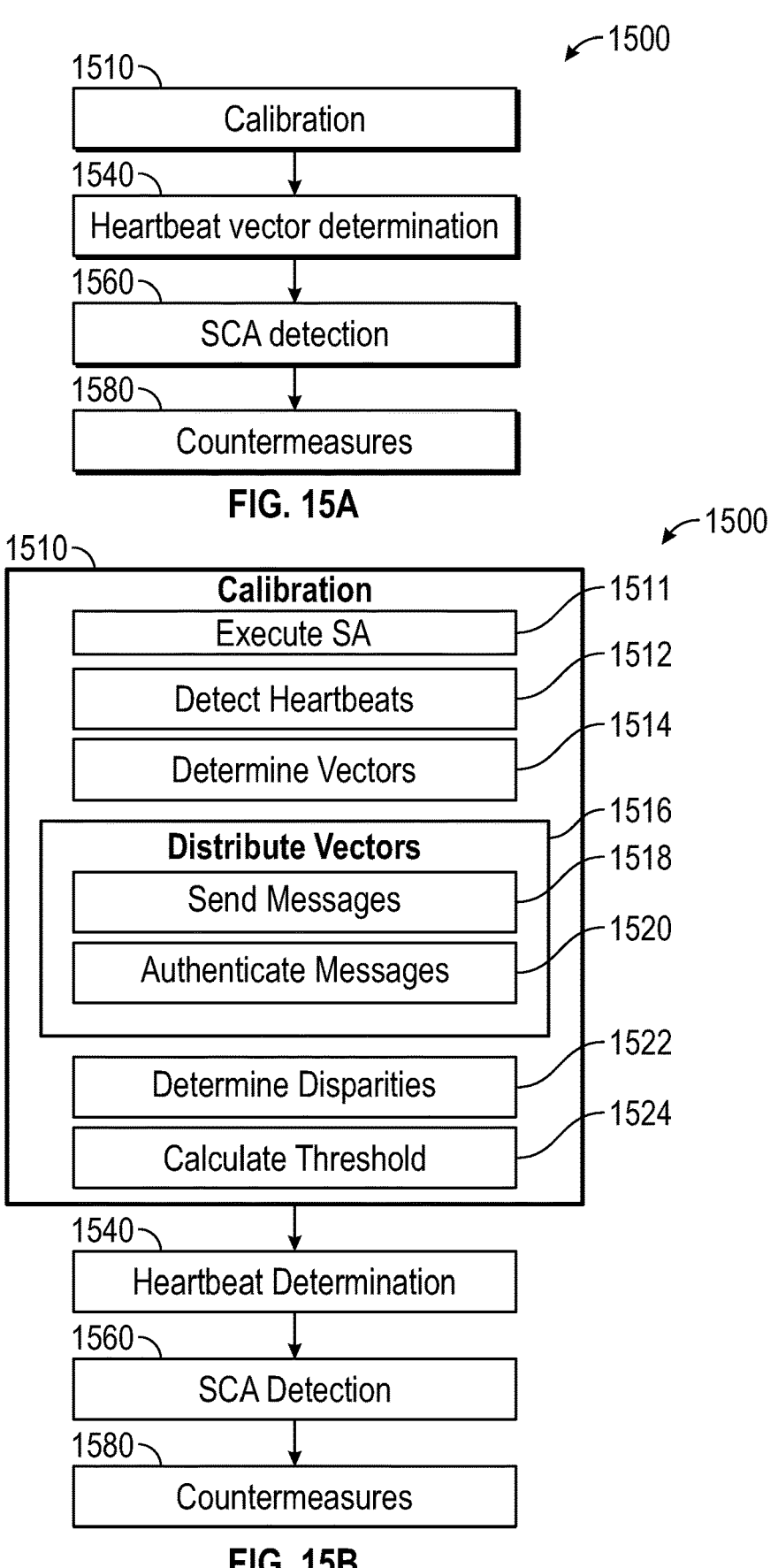

FIG. 15A is a flow diagram illustrating a method, consistent with some embodiments.

FIG. 15B is a flow diagram illustrating a method, consistent with some embodiments.

Figures 15C, 15D:
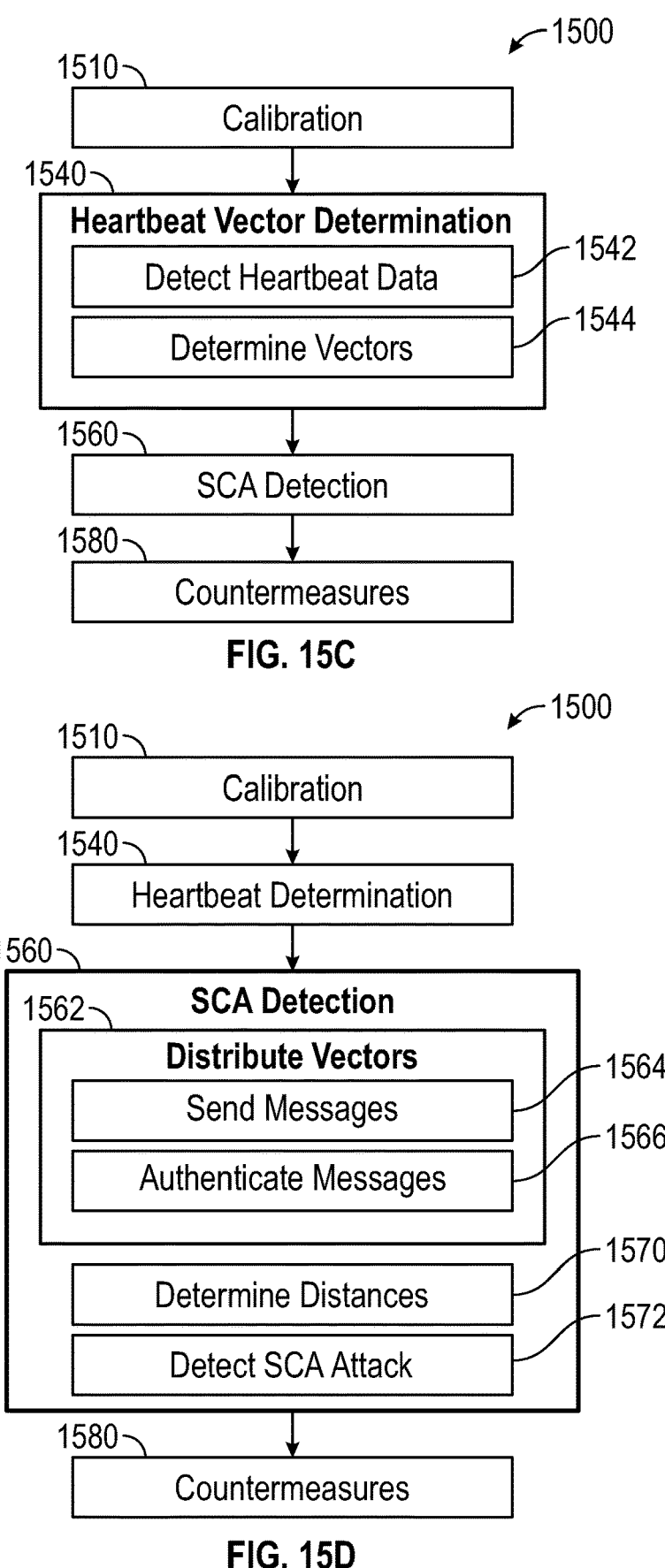

FIG. 15C is a flow diagram illustrating a method, consistent with some embodiments.

FIG. 15D is a flow diagram illustrating a method, consistent with some embodiments.

Figure 15E:
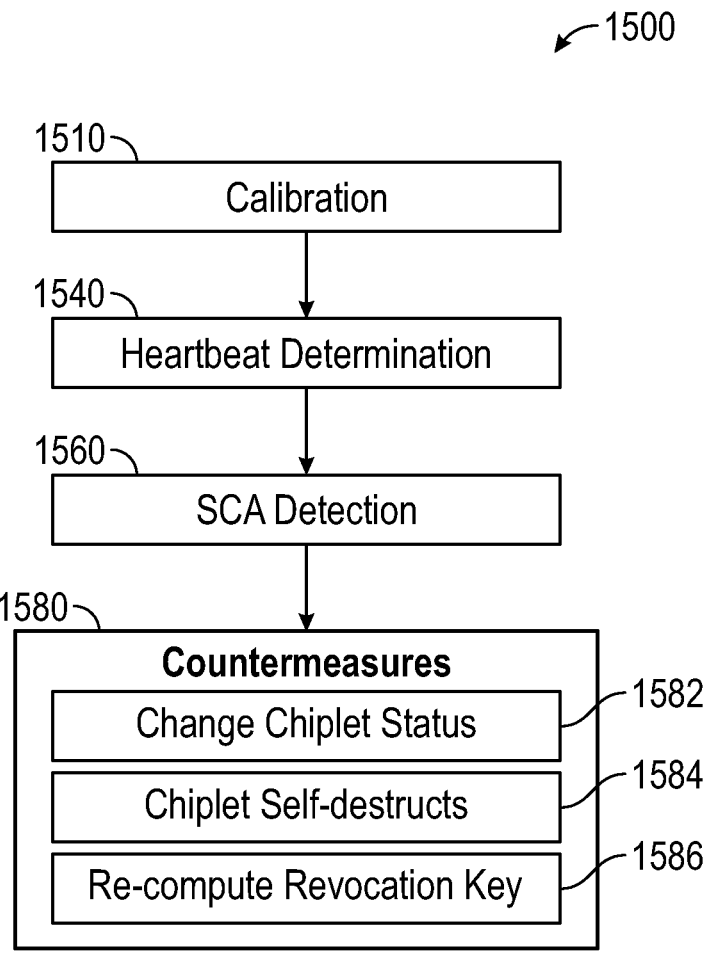

FIG. 15E is a flow diagram illustrating a method, consistent with some embodiments.

DETAILED DESCRIPTION

In the above-described drawing, certain features are simplified to avoid obscuring the pertinent features with extraneous details. The above drawings are not necessarily to scale.

It is to be understood that the disclosed embodiments are merely exemplary of the invention, which may be embodied in various forms. It is also to be understood that multiple references to "some embodiments" are not necessarily referring to the same embodiments.

As used in this document, the term "heartbeat" or "device heartbeat" is used to refer to cache-related activity associated with a processor of a chiplet, especially a chiplet in a network. More specifically, in some embodiments, "heartbeat" or "device heartbeat" is used to refer to the cache-related activity of a dedicated security co-processor (discussed below). In some embodiments, examples of heartbeats include cache-related activity such as for example node-loads, cache misses, LLC-load misses, LLC-loads, L1-dcache-load-misses, and/or other cache-related activity. The term "heartbeat data" is also used to refer to data evidencing the heartbeats or device heartbeats. The term "heartbeat vector" is also used to refer to one or more types of vectors derived at least in part from heartbeat data. A specific type of heartbeat vector is a processed vector (PV).

As used in this document, "dedicated security co-processor" refers to a co-processor of, for example a chiplet, that is dedicating to executing cryptographic processes, including those involving sensitive data. And, in some embodiments, the dedicated security co-processor does not handle auxiliary processes, such as for example, video, pictures, etc.

Although the discussion below is focused on chiplets in a network of chiplets, some embodiments are applicable to cores of a multi-core processor. Those of skill in the art will appreciate how to adapt the discussion below the cores of multi-core processors without undue experimentation.

There is an unmet need for systems and methods to detect and interrupt side-channel attacks, including cache-based side-channel attacks (cache-based SCA's). In particular that is a need for lightweight solutions that are feasible for resource-constrained devices, such as chiplets. Lightweight technologies and methods are those that require at least one of fewer computer power, fewer memory resources, or less electrical power compared to a device that is not resource-constrained.

Accordingly, some embodiments described herein offer lightweight solutions that are feasible for at least networks of chiplets. For example, some embodiments do not require the overhead of machine learning or neural network training. Some embodiments do not require the storage of weights, as in machine learning or neural networks. Some embodiments do not utilize matrix multiplication, which is a resource-using operation. Some embodiments do not utilize any non-linear functions.

In some embodiments an entire package of chiplets senses when a particular chiplet is attacked with a cache-based SCA. In some embodiments, the countermeasures involve an attacked chiplet self-destructing. In some embodiments the attacked chiplet's identity may also be revoked. These countermeasures are less complex and more hardware independent that at least some state-of-the-art countermeasure techniques.

In designing solutions for cache-based SCAs, one design consideration is whether a solution protects different security algorithms (e.g. AES, RSA, etc.) from attack, and if so, what the overhead is for applying the solution to protect different security algorithms.

In at least some machine-learning-based approaches, model retraining is required to protect against different attacks and to protect different target security algorithms. In contrast, in some embodiments described herein, a calibration operation remains unchanged irrespective of the type of cache-based SCA and irrespective of the security algorithm targeted by the attacker. The calibration operation described herein is less complex and less resource-intensive than model training (e.g. Linear Discriminant Analysis (LDA), Logistic regression (LR)).

Some embodiments are performed with a network of chiplets on a package. A given chiplet of the network has a co-processor dedicated to ensuring security.

In some embodiments, the network of chiplets is sharing some confidential data, such as a secret cryptographic key (SK) associated with a security algorithm. And it is desired to protect the confidential data from theft by a cached-based SCA).

In some embodiments, a dedicated security co-processor is equipped with circuitry for gathering data for detection of a cache-based SCA. This circuitry includes a hardware performance counter (HPC). In some further embodiments this circuitry further includes a dynamic voltage and frequency scaling (DVFS) circuit. In some further embodiments, a software performance counter (SPC) is available via the operation system to read out relevant data.

In some embodiments, the chiplets of the network store a variety of cryptographic keys, including at least:

a. A secret key (SK): In some embodiments, SK is generated by a physically unclonable function (PUF) on-the-fly and stored in SRAM during a session. For purposes of this document, a session is defined as a time duration between a power-on and power-off state (e.g. of the SRAM, of a chiplet, of a package, of a system, etc.). In some embodiments, SK is unique to each chiplet of the network. In some further embodiments, SK is a unique symmetric cryptographic key. In some other further embodiments, SK is a private key of public-private key pair. An attacker who successfully obtains SK may cause havoc among other chiplets of a network and may then successfully comprise the entire network. Therefore, embodiments described herein prioritize protecting SK.

b. A revocation key (RK): In some embodiments, RK is stored in non-volatile memory (NVM) associated with the dedicated security co-processor. RK may be stored in the NVM during an integration phase, which is at the time the chiplets of the network are fabricated in a package. In some embodiments, RK is a symmetric key and is common to all chiplets of the network. In alternative embodiments, instead of an RK key common to the chiplets of the network, an RSA system is used and the revocation keys are part of public key-private key pair.

In cache-based SCAs, an attacker may flush one or more cache memories associated with the dedicated security co-processor. The attacker may also cause the one or more cache memories to be reloaded. It is possible to detect a cache-based SCA by analyzing atypical activity (such as for example atypical based on frequency) related to these one or more cache memories. Having a dedicated security co-processor makes it easier to isolate and analyze this atypical activity. Typically, during an attack, the dedicated security co-processor will be frequently executing a security algorithm. Thus, when looking at the activity of a network of chiplets on a package, the activity of the dedicated security co-processors of the chiplets will be somewhat homogenous as compared to a situation in which the chiplets of the network do not have a security co-processor and the processors are executing different random programs. This comparative homogeneity makes it easier to detect the atypical cache-related activity associated with a cache-based SCA.

Some exemplary methods of detecting and interrupting a cache-based SCA have four stages: 1) a calibration stage; 2) a heartbeat vector determination stage (performed local to the individual chiplets); 3) a detection stage; and 4) a countermeasures stage.

In some embodiments, the purpose of the first stage, the calibration stage, is to compute a threshold T for atypical activity that will trigger countermeasures. The atypical activity is detected with at least one of a hardware performance counter (HPC), a dynamic voltage and frequency scaling circuit (DVFS), or a software performance counter (SPC). In some embodiments, only an HPC is used. In some embodiments, an additional tool such as for example, PAPI, Perfmon, or other diagnostic tool is additionally used to gather data from one or more of HPC, DVFS, or SPC. The setting of a threshold for atypical activity is related to the security algorithm being executed the dedicated security co-processor. A different threshold will be set for each different type of security algorithm. But the same calibration algorithm applies for setting a threshold regardless of the type of security algorithm.

The calibration stage includes collecting and processing heartbeat data local to the individual chiplets, but then disseminating the local heartbeat data throughout the network and then calculating the threshold based on the distributed heartbeat data. In some embodiments, the calibration stage is optional. For example, in some embodiments, the threshold T may be a user setting. In some embodiments, the calibration stage may only be executed when a network of chiplets is using a new security algorithm that needs a threshold T.

In some embodiments, the second stage, the heartbeat vector determination stage, is performed locally by the individual chiplets of the network. For example, in some embodiments a given individual chiplet of the network collects local heartbeat data that it then processes, through one or more intermediate states, into a single processed vector (PV) of data. A PV, in this document refers to a $1 \times n$ PV, where n is the dimension of the vector and is based on there being n types of heartbeat data (e.g. cache-miss data, node-load data, etc.). For example, if there are five types of heartbeat data, the PV is a $1 \times 5$ PV. In some embodiments, there is one PV per chiplet of the network.

In some embodiments, the third stage, the detection stage, is performed with distributed data. In some more specific embodiments, the detection stage begins with the individual chiplets sending their PV to all of the other chiplets in the network. If there are n chiplets in the network, then a given chiplet transmits to $n-1$ other chiplets. And each chiplet in the network receives $n-1$ PVs from $n-1$ other chiplets.

In some embodiments, these transmissions of the PVs are authenticated. For example, a given chiplet will compute a message authentication code (a MAC) on the PV before transmitting the PV with the MAC. In some particular embodiments, the MAC is a keyed hash message authentication code (HMAC) using the given chiplet's revocation key RK. The HMAC is also computed on the PV, and in more particular embodiments, is computed on a concatenation of the PV and a timestamp: HMAC (RK, PV∥timestamp).

When another chiplet receives the transmission from the given chiplet, it checks the given chiplet's status (e.g. valid or invalid, unrevoked or revoked, 1 or 0, etc.) on a table. If the given chiplet's status is not a valid one, then authentication fails. The other chiplet also authenticates the HMAC using its own copy of the RK. This authentication of the HMAC requires that the other chiplet's RK is the same as the given chiplet's RK. Therefore, if the given chiplet does not have a current and correct copy of RK, then the given chiplet is unable to send transmissions that can be authenticated.

After the PV transmissions are authenticated, then the PVs are further processed to determine disparities among the PVs. These disparities, dependent on particular embodiments, may include one or more of differences, distances, and/or squared distances between PVs. In some embodiments, the PVs are paired and the individual chiplets of the network perform computations to compute the disparities between all pairs of PVs in the network. In some embodiments, which are described below, each chiplet of the network performs its own computations of disparities. Some alternative embodiments utilize a nearest neighbor approach where only a subset of chiplets of a network perform at least some calculations.

In some embodiments, if there are n chiplets, then there are n(n−1) possible pairs of PVs in the network, including n(n−1)/2 unique pairs. All unique pairs are compared with each other to determine one or ore disparities between the PVs of each pair. Each chiplet performs these calculations. Thereafter, the given chiplet is associated with a set n(n−1)/2 disparities (e.g. distances, squared distances, etc.).

The individual chiplets then average these multiple disparities. For example, a given chiplet, which is associated with a set of n(n−1)/2 disparities, averages the multiple disparities to derive a single averaged disparity dn. Each of the other n−1 chiplets averages its set of n/(n−1)/2 disparities to derive a single average disparity, their own dn. These averaged disparities (dn's) are then compared to the threshold T computed in the calibration stage. And if a particular chiplet's average disparity exceeds the threshold, then that particular chiplet is detected as being under a cache-based SCA. If multiple chiplets have an average disparity that exceeds the threshold, then the first chiplet whose average disparity exceeds the threshold is detected as an attacked chiplet.

In some embodiments, the above disparities are squared distances. The use of squared distances magnifies the disparities between the chiplets. In some further embodiments, the distances are computed as L2 squared distances and the average disparities are average L2 squared distances.

As discussed above, in some embodiments, each chiplet of the network computes each dn for each of the chiplets, compares each dn to T, and determines if a chiplet is under attack. One consequence of detecting an attack with distributed data and with the chiplets doing their own computations is that when an attack is detected, all chiplets of the network detect the attack. And all chiplets identify the chiplet under attack. And therefore, all chiplets may take concerted action. And, the detection occurs before an attacker is able to progress the attack to the point of stealing secret data, such as a secret encryption key SK associated with the security algorithm under attack.

In some embodiments, in the fourth stage, the countermeasures involve some measures taken by the chiplet under attack and some measures taken by the other chiplets. In some embodiments, the particular chiplet under attack destroys its RK key. The particular chiplet thereby loses its ability to use the RK key to send messages that can be authenticated. In some embodiments, the particular chiplet also destroys its secret key SK also. In some embodiments, the other chiplets not under attack recompute RK to form a new RK that the particular chiplet under attack does not have access to. Again, the particular chiplet thereby loses its ability to use the RK key to send messages that can be authenticated. In some embodiments, each chiplet of the network changes the status of the particular chiplet under attack to an invalid status. In some particular embodiments, this is performed by changing that status in a table by changing a '1' (for valid) to a '0' (for invalid or revoked). This effectively eliminates the particular chiplet under attack from the network.

Thus, a cache-based SCA is detected and countermeasures employed before an attacker is able to steal secret data. The network of chiplets is able to continue (minus the excluded particular chiplet under attack).

Figure 1:
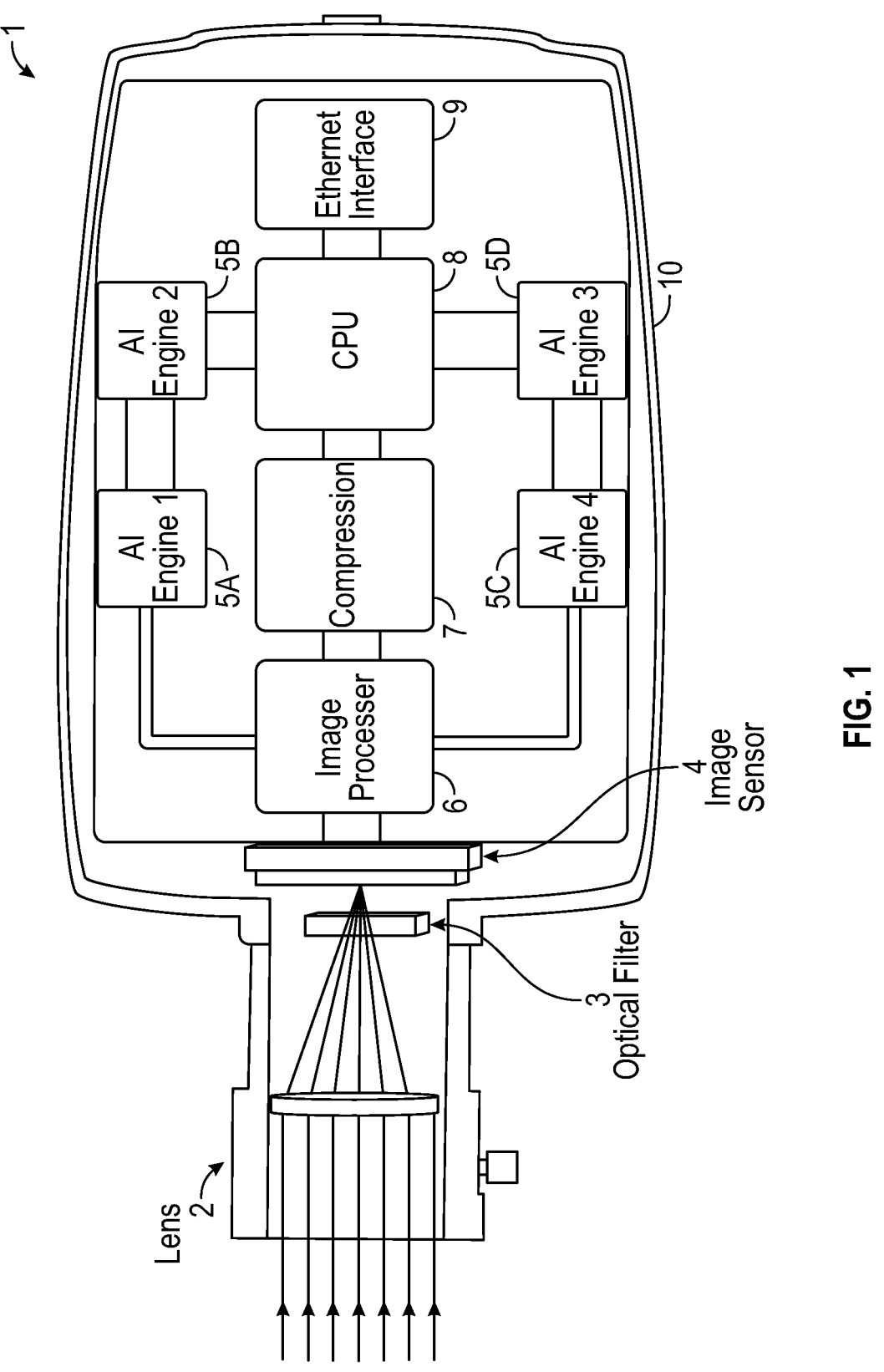
FIG. 1 is a simplified block diagram of a device-a smart camera-which may utilize a network of chiplets in which some embodiments may be practiced.

Referencing FIG. 1, a smart camera 1 provides an environment in which some embodiments may be practiced. Smart camera 1 includes lens 2 coupled or integral with housing 10. Housing 10 includes a processing device such as CPU 8. Housing 10 further includes artificial intelligence resources such as for example AI engines 5A-5D, ethernet interface 9, compression circuitry 7, and image processor 6, each of which is communicably linked with CPU 8. An optical filter 3 and an image sensor 4 are provided and are positioned to capture and process light entering lens 2. One or more of the above components (e.g. CPU 8, AI engines 5A-5D) could be at least partially implemented with one or more packets bearing chiplets.

Figure 2A:
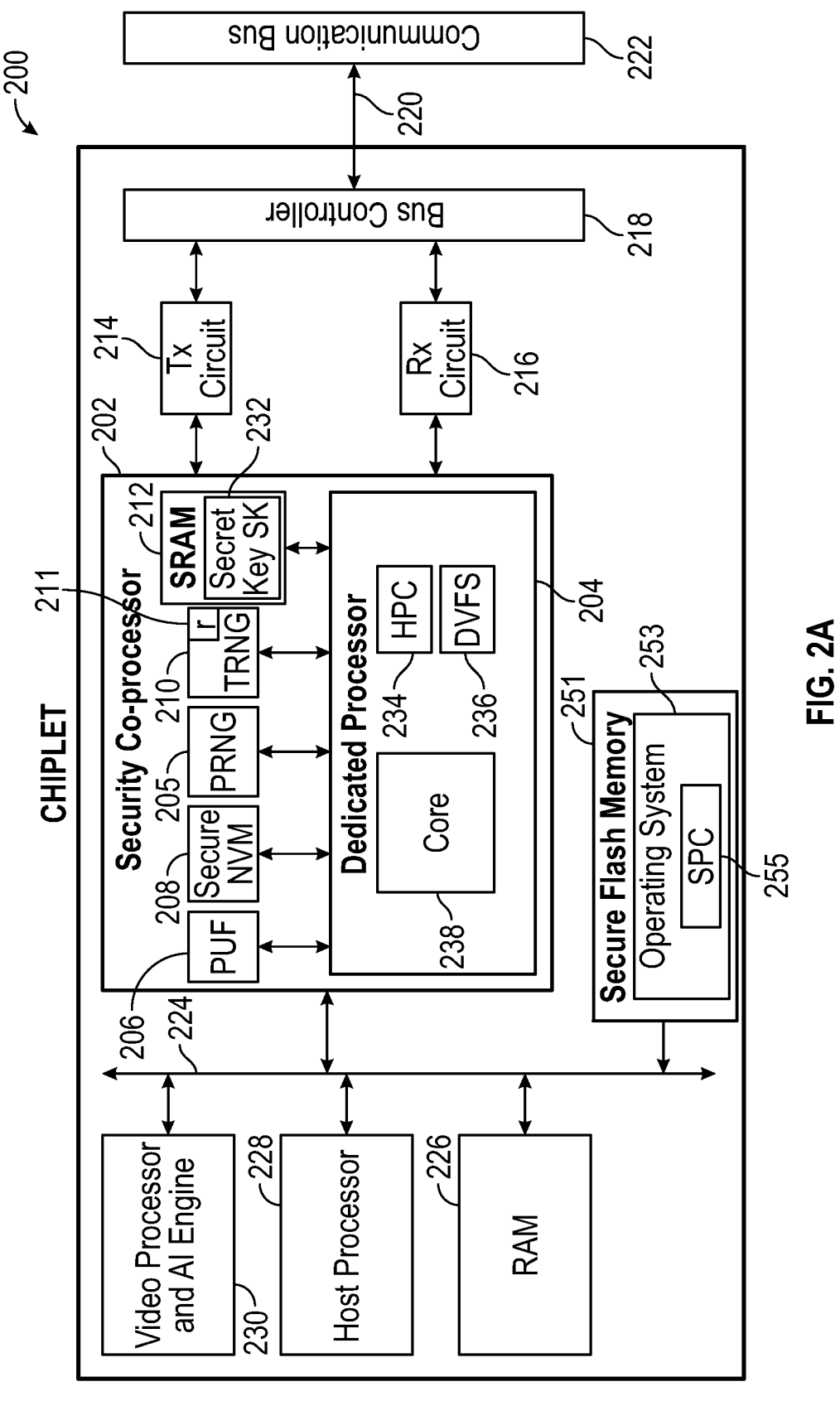
FIG. 2A is a simplified block diagram of an exemplary chiplet that is configured in accordance in some embodiments, showing a security co-processor and other components.

Referencing FIG. 2A, an exemplary chiplet 200 is presented, which is consistent with some embodiments. Chiplet 200 includes a host processor 228 and an internal bus 224 in communication with the host processor 228. In some embodiments, internal bus 224 is or utilizes one or ore of Advanced High-performance Bus (AHB), Advanced extensible Interface (AXI), or an Advanced Microcontroller Bus Architecture (AMBA). Chiplet 200 further includes a video processor and AI engine 230, which is also in communication with internal bus 224. A random-access memory (RAM) 226 is in communication with host processor 228 via the internal bus 224. A secure flash memory 251 is also in communication with internal bus 224. Secure flash memory includes operating system 253, which includes a software performance counter (SPC) 255.

Chiplet 200 further includes a security co-processor 202, which is in communication with operating system 253 via internal bus 224. A transmission circuit (TX circuit) 214 and a receiving circuit (RX circuit) 216 are in communication with security co-processor 202. Both TX circuit 214 and RX circuit 216 are in communication with a bus controller 218, which is in communication via communication link 220 with a communication bus 222 for communication with other chiplets in a network.

Security co-processor 202 includes a dedicated processor 204 which includes a core 238, a hardware performance counter 234, and a dynamic voltage and frequency scaling circuit (DVFS) 236. In some embodiments, dedicated processor 204 is configured to provide core 238 with heartbeat data via HPC 234 and DVFS 236. In some embodiments dedicated processor 204 is dedicated to executing all sensitive security and cryptographic processes for chiplet 200. In these embodiments, dedicated processor 204 does not execute auxiliary processes, such as video, picture, etc. In some embodiments, dedicated processor 204 accesses SPC 255 as a source of heartbeat data via internal bus 224.

Security co-processor 202 further includes a physically unclonable function (PUF) 206, a secure non-volatile memory (secure NVM) 208, a true random number generator (TRNG) 210, a pseudo-random number generator (PRNG) 205 and a static random access memory (SRAM) 212, all of which are communicably linked with dedicated processor 204. In some embodiments, secure NVM 208 is one or more of a flash memory, an erasable programmable read-only memory (EPROM), a ferroelectric random access memory (FRAM), a silicon-oxide-nitride-oxide-silicon (SONOS) structure, or a Metal-Oxide-Nitride-Oxide-Silicon (MONOS) structure.

In some embodiments, true random number generators, such as for example TRNG 210, are hardware-based true random number generators. A hardware-based true random number generator generates random numbers based on physical phenomena rather than based on algorithms. Some examples of these physical phenomena are thermal noise, random noise signals, photoelectric effects, quantum effects, and other physical phenomena.

In some embodiments, pseudo-random number generators, such as for example PRNG 205, are deterministic random number generators that generate pseudo-random numbers based on an algorithm. In some embodiments, a PRNG is implemented at least in part with a hardware accelerator. In some embodiments a PRNG is seeded at least in part with a random number or a pseudo-random number, such as RK. Because PRNG's are deterministic, using the same seed twice will produce the same pseudo-random number. Pseudo-random number generators are sometimes used instead of true random number generators because of reduced computational overhead.

PUF 206 generates secret key SK 232 on-the-fly as needed. SRAM 212 temporarily stores SK 232 during a session, which is between power on and power off. The TRNG 210 generates a true random number, such as revocation key RK 242, which is stored in secure NVM 208, as discussed below relative to FIG. 2B.

Chiplet 200 may be networked with other chiplets, as explained in more detail below relative to FIG. 3. In some embodiments, all chiplets in a network are at least similar to Chiplet 200. In other embodiments, different chiplets of a network may differ in the types of auxiliary programs they operate (e.g. video processor and AI engine), but all chiplets include a security co-processor with components at least similar to those described above. In some embodiments, a primary goal of the technologies and methods described herein is to protect the security co-processor and thereby to protect secret key SK 232.

Referencing FIG. 2B, a secure NVM 208 from chiplet 200, is shown in greater detail. Secure NVM 208 includes data 244 and executable logic 250.

Data 244 includes revocation key (RK) 242, chiplet status table 246 which stores an identification (ID) and a status for each chiplet in the network, and a threshold 247, which is computed in the calibration stage. Chiplet status table 246 is discussed in greater detail below relative to FIGS. 6A and 6B.

Data 244 further includes heartbeat data 263, which is data collected via at least one of HPC 234, DVFS 236 or SPC 255. Heartbeat data 263 may be configured in a matrix, as discussed below relative to FIG. 4. Secure NVM 208 also includes PV(s) 265 which in some embodiments includes a local PV generated locally from heartbeat data 263 and may additionally include PVs received from other chiplets of the network. Secure NVM 208 also includes average disparities 267, which is derived from PVs 265 transmitted across the network. In some embodiments, average disparities 267 is an average squared distance. In some further embodiments, L2 squared distance (e.g. as discussed below). In some embodiments, heartbeat data is not stored in secure NVM 208, but instead is transiently stored (e.g. for a few microseconds) in volatile memory, such as registers outside of the secure NVM 208. In these embodiments, the PV(s) 265, which are generated from the transient heartbeat data, is stored in the secure NVM 208.

In some embodiments, executable logic 250 includes at least one of executable instructions, executable code, or an application that when executed by dedicated processor 204 cause chiplet 200 to perform actions consistent with at least process 1500, discussed below.

In some alternative embodiments, executable logic 250 is at least partly implemented outside secure NVM 208 and is at least partly as hard-wired logic such as for example, an application-specific integrated circuit (ASIC), as field-programmable gate array (FPGA), or other logic circuitry.

Even where executable logic 250 is in the form of executable instructions stored in secure NVM 208, additional executable logic may be found in various other components of chiplet 200. For example, executable logic is also found in at least one or more of HPC 234, SPC 255, DVFS 236, TX circuit 214, RX circuit 216, bus controller 218, TRNG 210, PUF 206, or operating system 253.

In some embodiments, executable logic 250 includes a variety of circuits. Even though FIG. 2B shows these circuits as being within secure NVM 250 as part of executable logic 250, in some embodiments, at least part of the functionality may be outside of executable logic 250, for example one or more circuitries could include or reside in at least one or more of HPC 234, SPC 255, DVFS 236, TX circuit 214, RX circuit 216, bus controller 218, PRNG 205, TRNG 210, or operating system 253. In some embodiments, one or more circuitries includes data, such as for example data found in one or more of SRAM 212 (e.g. SK 232), or secure flash memory 250. In some embodiments, one or more circuitries includes one or more of revocation key RK 242, heartbeat data 261 PV(s) 265, or average disparities 267. The above listing is not intended to be exclusive. When the words "circuitry" or "circuitries" are used, they may refer to any of the above, all of the above, or any combination of the above, without limitation.

In some embodiments, executable logic 250 includes a calibration circuit 252, a heartbeat determination circuit 268, an SCA determination circuit 274, and a countermeasures circuit 286.

In some embodiments, calibration circuit optionally includes one or more of heartbeat determination circuit 254, vector determination circuit 256, vector distribution circuit 258, disparity determination circuit 264, or threshold calculation circuit 266. In some embodiments, vector distribution circuit 258 optionally includes one or more of message computation and broadcast circuit 260 or message authentication circuit 262.

In some embodiments, heartbeat determination circuit 268 optionally includes one or more of heartbeat detection circuit 270 or vector determination circuit 272.

In some embodiments, SCA determination circuit 274 optionally includes one or more of vector distribution circuit 276, disparity determination circuit 282, or SCA determination circuit. In some embodiments, vector distribution circuit 276 optionally includes one or more of message computation and broadcast circuit 278 or message authentication circuit 280.

In some embodiments, countermeasures circuit 286 optionally includes one or more of status invalidation circuit 288, chiplet self-destruct circuit 290, or revocation key re-computation circuit 292.

Figure 3:
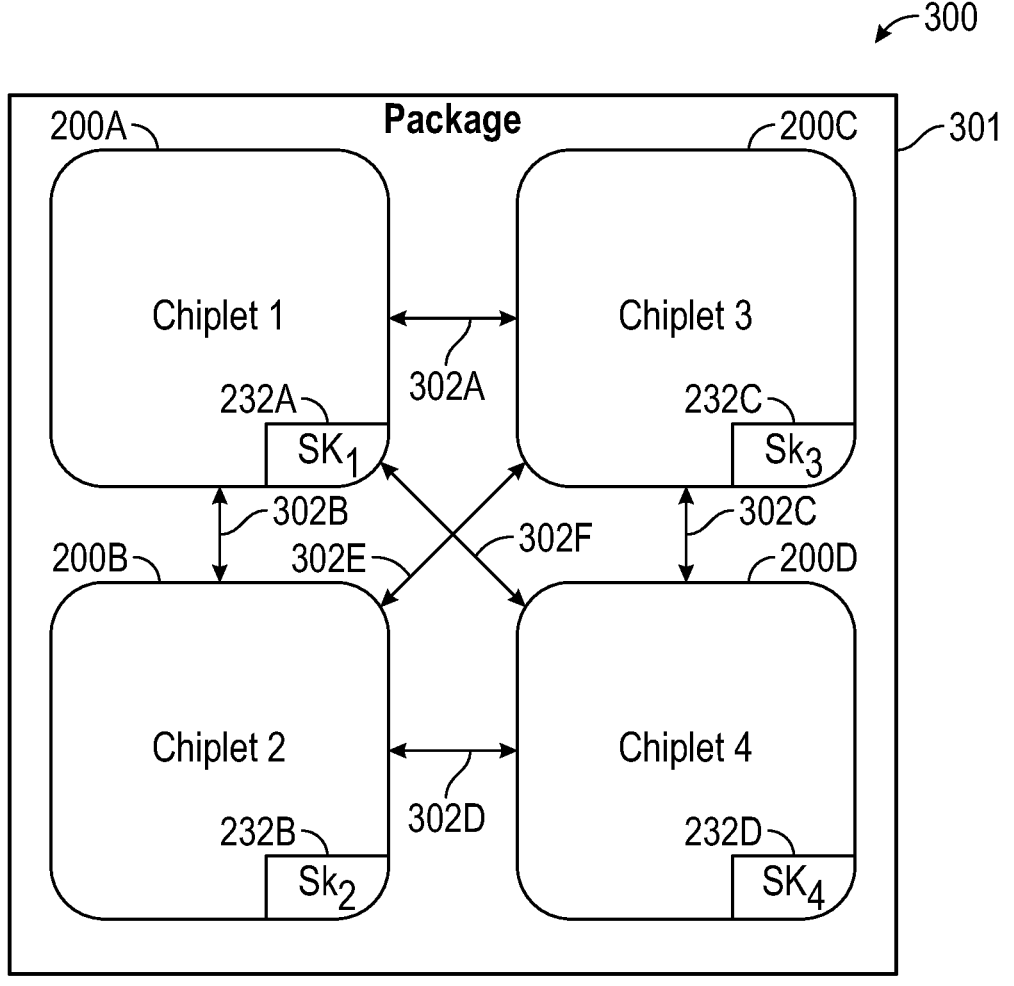
FIG. 3 is a simplified block diagram of an exemplary network of chiplets in a package, in accordance with some embodiments, showing a plurality of chiplets and a plurality of communication pathways, the chiplets being at least similar to the chiplet of FIG. 2.

Referencing FIG. 3, a chiplet network 300 is, consistent with some embodiments, located on a package 301. The chiplet network 300 includes chiplets 200A-200D which are fabricated on package 301. Chiplet network 300 is a fully connected network because chiplets 200A-200D are fully in communication with each other via communication links 302A-302F. As is discussed below relative to FIG. 5A, the fully-connected nature of chiplet network 301 facilitates communication, such as for example, communications described below with reference to FIG. 5A.

Chiplets 200A-200D individually store a secret key (SK). As shown, chiplet 200A (Chiplet 1) stores SK1 (232A), chiplet 200B (chiplet 2) stores SK2 (232B), chiplet 200C (chiplet 3) stores SK3 (232C), and chiplet 200D (chiplet 4) stores SK4 (232D). Chiplets 200A-200D are configured to protect SK1-SK4 using the technology and methods disclosed herein. In some embodiments, SK1-SK4 are symmetric keys with each chiplet having and protecting its own unique key. Some alternative embodiments, SK1-SK4 are private keys of public key-private key pair using an RSA (Rivest-Shamir-Adleman) cryptosystem.

In some embodiments, chiplet network 300 includes all chiplets on package 301. In some alternative embodiments, fewer than all chiplets in a package are part of chiplet network 301.

A more detailed discussion follows of stage 2, which determines heartbeat vectors. Unlike stage 3 which works with data distributed throughout the chiplet network, in some embodiments stage 2 involves the individual chiplets of the network making their own local computations with data local to the respective individual chiplets.

Figure 4A:
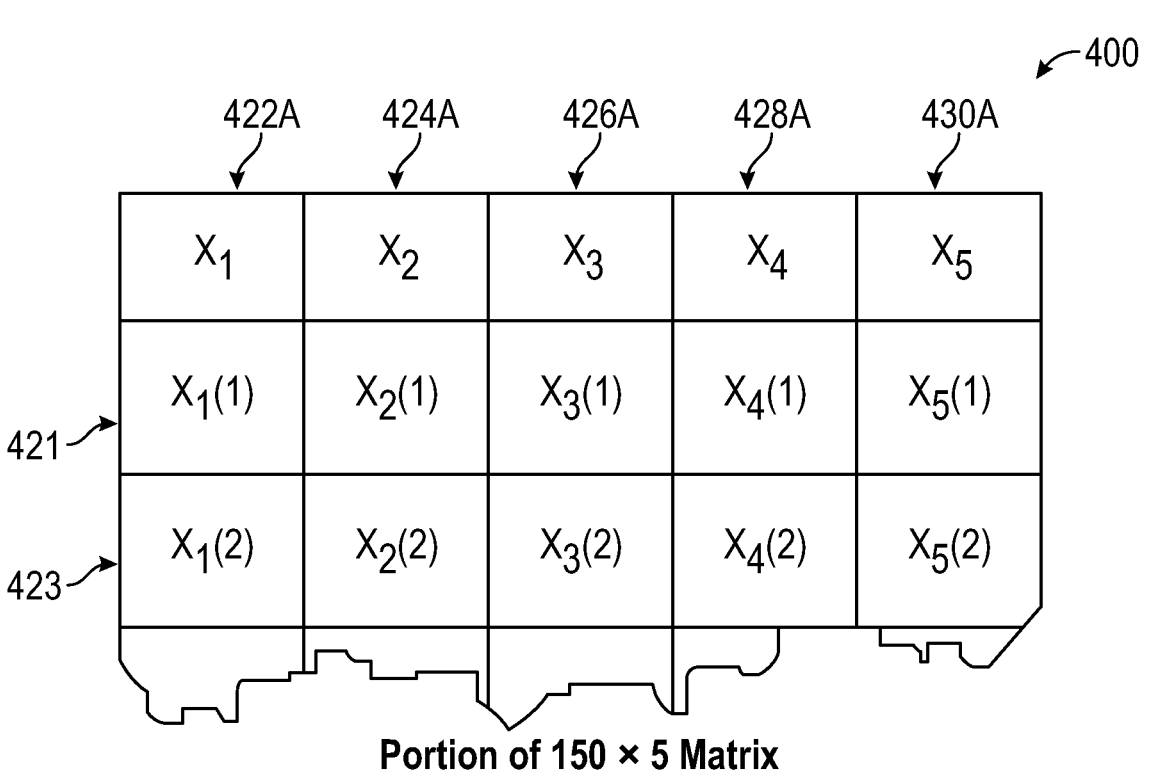
FIG. 4A is a diagram of an example 150×5 matrix storing columns storing values for 5 selected features, in accordance with some embodiments.

Referencing FIG. 4A, an exemplary matrix 400 stores results from heartbeat detection. In the embodiment shown matrix 400 contains 5 columns 422A, 424A, 426A, 428A, and 430A. Matrix 400 is an example of heartbeat data 263.

As discussed above, the second stage of determining heartbeat vectors performed locally by the individual chiplets of the network. That is a given individual chiplet of the network collects local heartbeat data. Initially, there are a variety of types of heartbeat data that may be sampled and collected. In some embodiments, the number and types of heartbeat data to be sampled and collected is a user setting. For purposes of illustration, in some specific embodiments there are 5 types of heartbeat data collected, namely, node-loads, cache misses, LLC-load misses, LLC-loads, or L1-dcache-load-misses. This heartbeat data is collected using at least one of an HPC 234, a DVFS 236, or an SPC 255. In some embodiments, the heartbeat data is one or more of node-loads, node-stores, top-down-fetch-bubbles, cache-references, branch-load-misses, branches, data translation lookaside buffer (DTLB) stores, data translation lookaside buffer (DTLB) store-misses, CPU-cycles, bus-cycles, cache misses, level 1 (L1) data cache misses, level 1 (L1) instruction cache misses, level 1 (L1) total cache misses, level 1 (L1) dcache-load-misses, level 2 (L2) instruction cache accesses, level 2 (L2) instruction cache misses, level 2 (L2) total cache accesses, level 2 (L2) total cache misses, level 3 (L3) instruction cache accesses, level 3 (L3) total cache accesses, level 3 (L3) total cache misses, system-wide total CPU cycles, last-level cache (LLC) load misses, last-level cache (LLC) loads, system-wide branch miss-predictions, or system-wide total page faults.

In some embodiments, the collection of heartbeat data may begin with a power-on and with initializing a processed vector (PV) to zero, as in for example PV:=0. The above heartbeat data is then sampled at a sampling rate that is supported by the dedicated processor 204. For example, in an embodiment associated with FIG. 4A, the above five types of data are sampled at a rate of 1 μsec, and collected for 150μ seconds to retrieve a matrix of size 150×5, which is, for example, matrix 400.

As noted above, matrix 400 has 5 columns 422A storing data type $X_1$, column 424A storing data type $X_2$, column 426A storing data type $X_3$, column 428 storing data type $X_4$, and column 430A storing data type $X_5$. Because the data was sampled 150 times, there are 150 rows of data. Two rows 421 and 423 are shown.

Figure 4B:
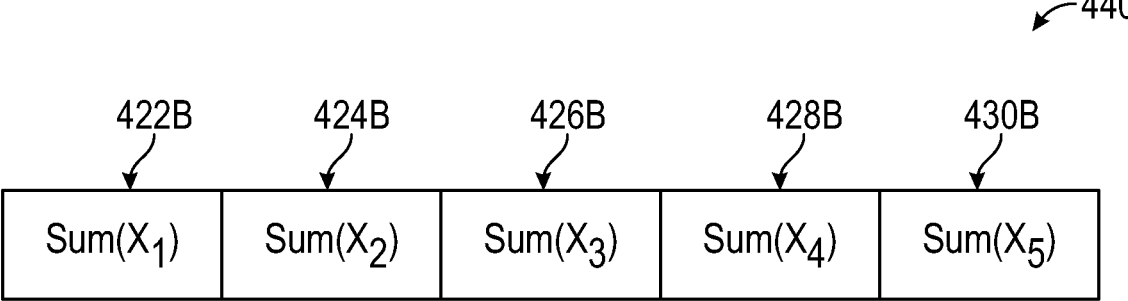
FIG. 4B is a diagram of an exemplary 5-dimensional intermediate vector, consistent with some embodiments.

Referencing FIG. 4B, a 5-dimensional vector 440 is shown. Vector 440 is the result of adding the rows of matrix 400. Vector 440 has 5 elements. These are element 422B which is the sum of all the $X_1$ data in the rows of matrix 400, element 424B which is the sum of all the $X_2$ data in the rows of matrix 400, element 426B which is the sum of all the $X_3$ data in the rows of matrix 400, element 428B which is the sum of all the $X_4$ data in the rows of matrix 400, and element 430B which is the sum of all the $X_5$ data in the rows of matrix 400. All of the information contained in the 150 rows of data of matrix 400 is now condensed into a single 5-dimensional vector. Vector 440 is used to compute a "processed vector" (PV), which is discussed below. Vector 440 is thus an intermediate value between matrix 400 and PV 460. In the discussion below, vector 440 is referred to as "V."

Figure 4C:
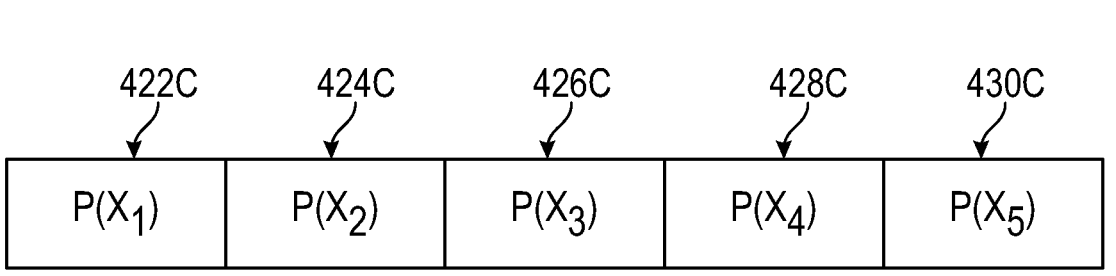
FIG. 4C is a diagram of an exemplary 5-dimensional processed vector, consistent with some embodiments.

Referencing FIG. 4C, a PV 460 has been derived from vector 440 (V). That is, PV 460 is a processed version of vector 440. PV 460 is also a 5-dimensional vector with columns 422C for processed X1 data, 424C for processed X2 data, 426C for processed X3 data, 428C for processed X4 data, and 430C for processed X5 data.

In some embodiments, the following equation is used to compute PV 460 from V 440 and a previous version of PV 460. In this equation, PV 460 is PV (new) with PV (new): =0.999*PV+0.001*V. Thus, a new PV is computed by multiplying 0.999 times the previous value of PV (in some embodiments PV is initialized state of '0'). The product of this multiplication is then added to the product 0.001*V to arrive at PV (new), which is PV 460. The processes discussed above, including the derivations of matrix 400, vector 440, and PV 460 are all performed, in some embodiments, local to each individual chiplet (e.g. each of 200A-200D) of the network 300. In the following discussions, PV (new) is referred to as PV 460.

A more detailed discussion of stage 3 follows. As discussed above, stage 3 includes detection of a cache-based SCA. And in contrast to stage 2, stage 3 works in part (each chiplet has a local PV 460) with data that is distributed throughout the network of chiplets. In some embodiments, the individual chiplets of the chiplet network still make their own local computations, but the work is performed in part with the distributed data. Therefore, in some embodiments, when an attack is detected, all chiplets of the network detect it. And therefore all of the chiplets can launch one or more countermeasures as described below regarding stage 4.

Once PV 460 is computed in each chiplet of a network, the PV's are distributed. If J is the set of all chiplets in a network (e.g. in a package), then every chiplet X that is a member of J ($\forall X \in J$) computes an HMAC (i.e. a keyed hash message authentication code) on a concatenation of PV 460 and a time stamp. HMAC requires a key, and the chiplets of network 300 use the revocation key (RK) 242. Then, the chiplets of the network transmit their PV and the HMAC, which is HMAC (RK, PV||timestamp)), to the other chiplets of the network.

Figure 5A:
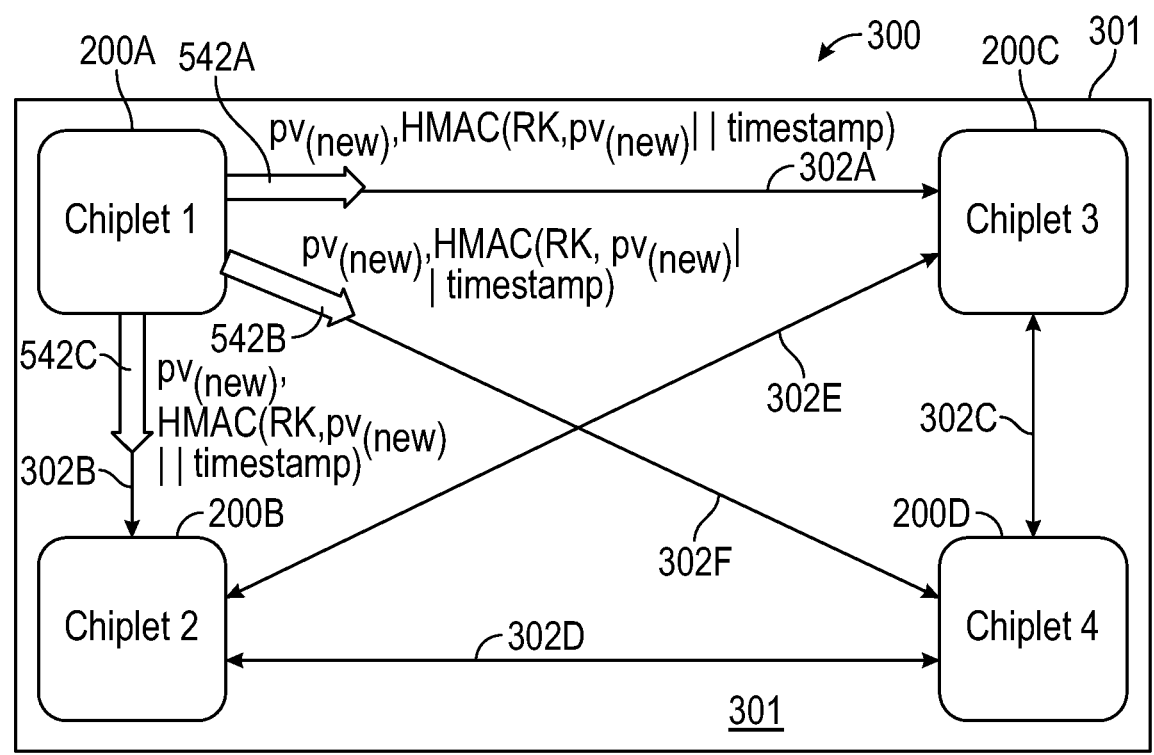
FIG. 5A is a simplified block diagram of the network of chiplets of FIG. 3, in accordance with some embodiments, showing a chiplet 1 communicating values to other chiplets in the network.

Referencing FIG. 5A, consistent with some embodiments, a chiplet network 300 is shown with transmissions of the PV and HMAC taking place. More specifically, chiplet 200A (chiplet 1) sends transmissions of messages containing PV and HMAC to the other chiplets of network 300. More specifically, it sends message 542A, which is PV, HMAC (RK, PV||timestamp) via communication link 302A to chiplet 200C (chiplet 3), message 542B (same as message 542A) via communication link 302F to chiplet 200D (chiplet 4), and message 542C (same as message 542A) via communication link 302B to chiplet 200B (chiplet 2).

Figure 5B:
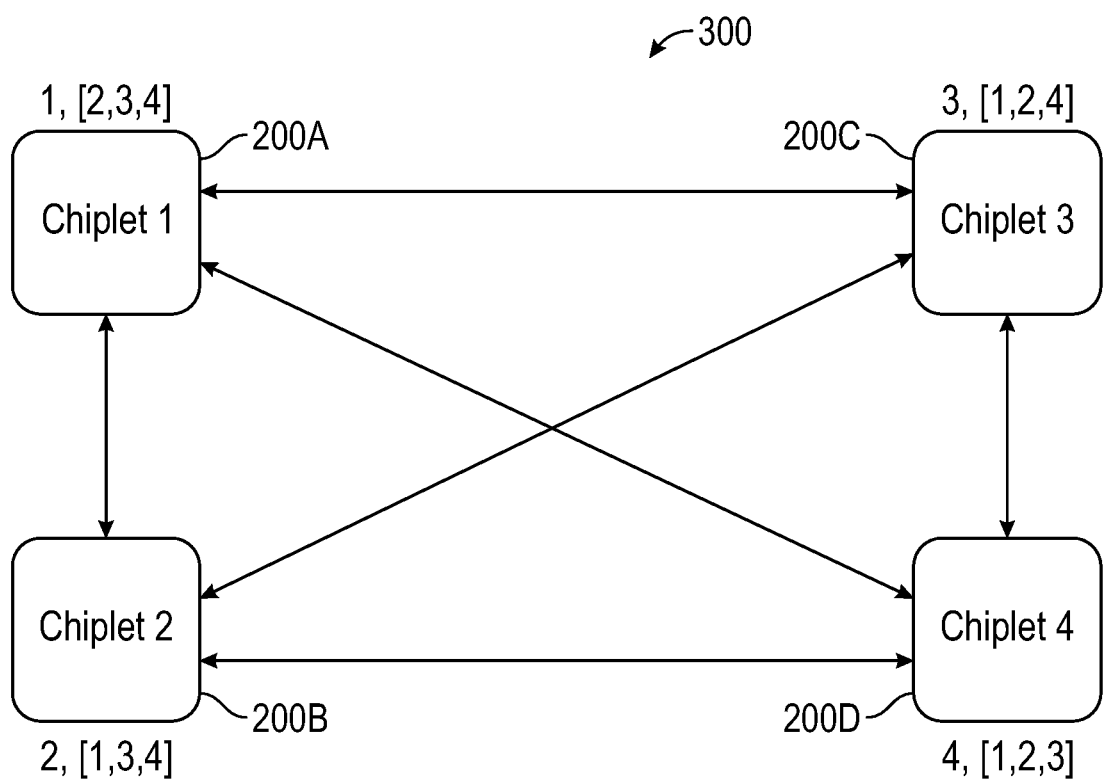
FIG. 5B is a simplified block diagram of the network of chiplets of FIG. 3, in accordance with some embodiments, showing distribution of PV's among the chiplets of the network.

The other chiplets 200B-200D make corresponding transmissions (not shown) of their respective PV and HMAC. For example, referencing FIG. 5B in network chiplet 200A (chiplet 1) has its own PV and additionally receives PV's from chiplets 2, 3, and 4. Chiplet 200B (chiplet 2) has its own PV and additionally receives PV's from chiplets 1, 3, and 4. Chiplet 200C (chiplet 3) has its own PV and additionally receives PV's from chiplets 1, 2, and 4. And Chiplet 200D (chiplet 4) has its own PV and additionally receives PV's from chiplets 1, 2, and 3.

Upon receiving the transmissions, in some embodiments each of the chiplets 200A-200D perform authentication of the messages. For example, upon receiving message 542C, chiplet 200B performs two steps. It authenticates the message and also checks the status of the sending chiplet 200A. In some alternative embodiments, fewer that all of the chiplets 200A-200D receive the messages or perform the authentication.

Chiplet 200B authenticates the HMAC using both the PV received from chiplet 200A and its copy of RK 242. If the authentication of the HMAC fails, chiplet 200B sends a authentication fail message to the sender, chiplet 200A. Chiplet 200A then resends message 542C. In some embodiments, if the HMAC authentication fails a set number of time, for example 3 times, then chiplet 200B stops communication with chiplet 200A for an interval of time, for example 5 minutes.

However, in some embodiments the message is not authenticated until chiplet 200B checks the status of chiplet 200A. Referencing FIG. 6A, a status table 246 has a first column 601 for identification (e.g. chiplet identifiers 607A, 607B) of all the chiplets of the network 301 (for brevity, chiplets 200A and 200B are shown) and a second column 603 for a status (e.g. status indicators 604A, 604B) of all of the chiplets of network 301 (for brevity, only statuses for chiplets 200A and 200B are shown). Thus in a first row 605, status table 246 indicates that chiplet 200A has a status of '1' for valid. A second row 606 indicates that chiplet 200B also has a status of '1' for valid. Thus, when chiplet 200B checks table 246 it sees that chiplet 200A has a valid status. With both the authentication of the HMAC and the verification of the status of chiplet 200A, the message 542A is authenticated.

Once the transmitted messages are authenticated, the chiplets of network 300 turn to computing the disparities among the various PV's transmitted within the network. In some embodiments, each chiplet has a complete copy of all of the PV's from the other chiplets in network 300, at total of $n(n-1)$ total PV pairs, where n is the number of nodes in network 300. In some embodiments, these disparities are computed as at least one of distances or squared distances. In some further embodiments, the distances are L2 squared distances. An example of how to compute these disparities as L2 squared distances follows. Those of skill in the art, having once been appraised of the teachings, will appreciate that other types of distances may also be computed.

Initially, each chiplet computes all possible pairs of PV's (including its own PV and the PV's received from other chiplets). Ignoring duplicate PV pairs, each chiplet thereby has $n(n-1)/2$ unique pairs of PV's to analyze. In some embodiments, the analysis includes computing an L2 squared distance for each unique PV pair. For example, a hypothetical chiplet X may have a PV pair that includes PV1 which is [a1, a2, a3, a4, a5] and PV2 which is [b1, b2, b3, b4, b5]. The L2 squared distance of the two vectors PV1 and PV2 may be computed as follows:

$$d = |a1-b1|^2 + |a2-b2|^2 + |a3-b3|^2 + |a4-b4|^2 + |a5-b5|^2.$$

The distance d is a scaler value that can be directly compared with the threshold T computed in the calibration stage, which is also a scaler value. After applying the above to all unique PV pairs, chiplet X has $n(n-1)/2$ distances (for example L2 squared distances). These distances are then averaged by chiplet X to arrive at n average distances, one of these n average distances corresponding to each chiplet in the network. Each chiplet in the network calculates all n average distances.

While a chiplet X has $n(n-1)/2$ distances, calculating averages requires a magnitude of $n(n-1)$ computations. As noted above, each chiplet has stored in hardware $n(n-1)/2$ distances (for example, a distance between PV1 and PV2, a distance between PV1 and PV3, a distance between PV1 and PV4, etc.). When calculating the average distances (e.g. d1 which is an average of the distances between PV1 and each of the other PV's, d2 which is an average of distances between PV2 and each of the other PV's, . . . and so on) the chiplet replicates some of the distances from $n(n-1)/2$ to make the total computations rise to $n(n-1)$. Thus, to calculate d1 the chiplet averages $n-1$ distances, to calculate d2 the chiplet averages another $n-1$ distances and this procedure continues until the chiplet calculates dn (nth average distance for nth chiplet). This procedure is performed inside each chiplet. That is, each chiplet is calculates its neighbors' as well as its own average distances. Therefore, each chiplet knows the exact status of all the other chiplets in the network. The total computations inside each chiplet for computation of the averages therefore are on an order of $n*(n-1)$.

Referencing FIG. 5C, a specific example of the above process is illustrated. This process would be performed in a single chiplet. This example assumes a chiplet has PV's from all four chiplets in a network (e.g. network 300). Further, it is assumed that PV1 is the PV for chiplet 1, PV2 is the PV for chiplet 2, PV3 is the PV for chiplet 3, and PV4 is the PV for chiplet 4.

As indicated in FIG. 5C, a first distance d4 is derived as the average of distances dist 41, dist 42, and dist 43, wherein each of these distances (referred to as norms) is the squared L2 distance between the PV's of the indicated PV pairs. For example, dist 41 is the squared L2 distance between PV4 and PV1, dist 42 is the squared L2 distance between PV4 and PV 2, and dist 43 is the squared L2 distance between PV4 and PV3. Distance d4 corresponds to chiplet 4 because each PV pair includes PV 4.

Continuing, a second distance d1 is derived as the average of distances dist 12, dist 13, and dist14, wherein each of these distances is the squared L2 distance between the PV's of the indicated PV pairs, as discussed above. Distance d1 corresponds to chiplet 1 because each PV pair includes PV1.

Continuing, a third distance d2 is derived as the average of distances dist 23, dist 24, and dist 21, wherein each of these distances is the squared L2 distance between the PV's of the indicated PV pairs, as discussed above. Distance d2 corresponds to chiplet 2 because each PV pair includes PV2.

Continuing, a fourth distance d3 is derived as the average of distances dist 32, dist 34, and dist 31, wherein each of these distances is the squared L2 distance between the PV's of the indicated PV pairs, as discussed above. Distance d3 corresponds to chiplet 3 because each PV pair includes PV3.

If any of d1, d2, d3, or d4 exceeds the threshold T, then the corresponding chiplet of chiplets 1-4 is regarded as an attacked chiplet and countermeasures are taken. If more than one distance exceeds the threshold, the first to exceed the threshold is detected as the attacked chiplet. If there are other attacked chiplets, these additional attacked chiplets are detected in repeat iterations of the above-described process.

The number of PV pairs in this algorithm is given by $n(n-1)$ where n is the number of chiplets. In the above example, there are four chiplets, so the number of pairs is given by $4(4-1)$, which is 12. And as can be seen there are 12 PV pairs (in groups of 3). The number of computations made however is given by $n(n-1)/2$ because some of the pairs (e.g. dist 43, dist 34) are duplicates. Therefore, the number of computations in this example is 4(4−1)/2, which is 6.

Various ways of computing the disparities between the PV's may be employed. In some embodiments, a simple distance may be computed without squaring. Or, other forms of squaring the distances may be employed. In general the squaring of distances creates greater disparities as compared to unsquared distances.

Continuing with the above examples, the average distances dn are then compared with the threshold T computed in the calibration stage. If for some $dy \in \{set of dn\}$, $dy>T$, then chiplet y (if dy belongs to chiplet Y) is an attacked chiplet at whom countermeasures are then directed.

A more detailed discussion of stage 4 follows. As discussed above stage 4 relates to countermeasures. Depending on specific embodiments, countermeasures include at least one or more of (1) causing the attacked chiplet to destroy its copy of the revocation key, (2) causing the other non-attacked chiplets of the chiplet network to recompute the revocation key, or (3) changing a status of the attacked chiplet on status tables to indicate that the attacked chiplet is invalid or revoked.

In some embodiments, a chiplet may be caused to destroy its copy of the revocation key in a variety of ways, including for example with at least the following steps: 1) generating a random number using its true random number generator (e.g TRNG 210), that is r<-TRNG( ); 2) computing Enc (r, Rk), where Enc is an encryption function, r is the random number generated in step 1 which is used as a symmetric encryption key, and RK is the revocation key (e.g. RK 242), which is encrypted; and 3) clearing a portion of NVM 208 where the true random number r is stored. Without access to r, the attacked chiplet has no feasible way to recover RK, which is now encrypted with r being the encryption key.

In some embodiments, the other chiplets (other than the attacked chiplet) may be caused to recompute the revocation key in a variety of ways, including for example by executing a pseudo-random number generator (e.g. PRNG 205) using the current revocation key (e.g. RK 242) as the seed. That is a new revocation key RK' is generated via: RK'=PRNG (RK). Because a PRNG is deterministic, when the individual chiplets of the network use the same seed (e.g. RK), they will generate the same new revocation key RK'.

In some embodiments, a countermeasure after detecting an attacked chiplet is to change a status of the attacked chiplet on status tables to indicate that the attacked chiplet is invalid or revoked. In some embodiments, each chiplet stores a status table in NVM 208. Referencing FIG. 6B, the status table 246 of FIG. 6A shown with an updated status of '0' for chiplet 200A (e.g. status indicator 604A changed to '0'). For purposes of the example shown in FIG. 6B, it is assumed that chiplet 200A has been shown to be under attack by a cache-based SCA. And it is further assumed that chiplet 200B has not been shown to be under such an attack.

Status table 246 has been updated to change the status (shown in column 603, row 605) for chiplet 200A (chiplet identity in column 601 and row 605). As indicated the status is now '0' for a invalid or revoked status. In contrast, the status (shown in column 603, row 606) of chiplet 200B (chiplet identity in column 601, row 606) is still '1' for a valid or not revoked status. With this change in status, chiplet 200A cannot send a PV which can be authenticated. Authentication would fail.

In some embodiments, stages 2-4 above are continually and cyclically performed in specific repeating period of time. For example in some embodiments, the above stages are performed every X μ seconds. In some embodiments, X is 150. In these embodiments a new cycle of states 2-4 is performed every 150μ seconds. This time period is not fixed and in some embodiments is a user setting. While in the above discussion it may appear that stages 2-4 are preformed sequentially, that is not necessarily the case. During these repeating time periods, the three stages may be occurring at least partly concurrently.

A more detailed discussion of stage 1, calibration, follows.

Figures 7A, 7B:
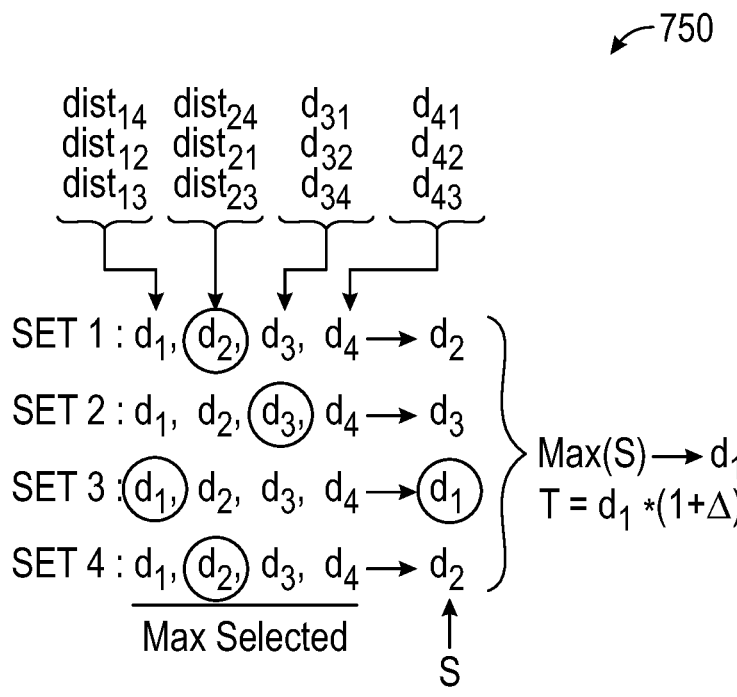
FIG. 7A is a table showing data related to a calibration step, consistent with some embodiments.
FIG. 7B is a diagram illustrating a process for computing a threshold T in the chiplet network of FIG. 3, in accordance with some embodiments.

An embodiment for calibration of a network of chiplets is now discussed relative to FIG. 7A. As discussed above, calibration is an initial stage that is carried out by a network of chiplets. The result of the calibration stage is computation of a threshold T which is used for detecting cache-based SCAs. In some embodiments, the calibration stage is optional. For example, the threshold could be provided as a user setting. In other embodiments, the calibration stage is computed once for a given security algorithm, and then may not be recomputed for at least a given period of time or if a computing environment changes.

This discussion assumes that the individual chiplets of the network are each trying to protect a secret encryption key (e.g. SK 232). This discussion further assumes that each chiplet has a security co-processor (e.g. co-processor 202) and that the co-processor is executing a particular security algorithm, such as for example AES. The calibration state computes a threshold specifically for that security algorithm. Each security algorithm will be associated with a threshold specific for that security algorithm.

Thus, in some embodiments, the calibration stage includes calculating a threshold T for a specific security algorithm—a security algorithm to be protected. The calibration stage, in these embodiments, begins with executing the particular security algorithm in the individual chiplets of the network of chiplets for the purpose of computing a threshold T associated with the specific security algorithm.

Referencing FIG. 7A, in some embodiments, a calibration stage includes executing iterations of the security algorithm in multiple sets. In table 700 of FIG. 7A, multiple iterations of a security algorithm, such as for example AES, are executed in 5 sets. Specifically there are 10 iterations of AES executed in set 1, 10,000 iterations executed in set 2, 30,000 iterations of AES executed in set 3, 48,000 iterations of AES executed in set 4, and 50,000 iterations of AES executed in set 5. The number of sets and the number of iterations executed in each set are not fixed. In some embodiments, this is a user setting.

During and/or after the above iterations, within the calibration stage the chiplets of the network are executing stages 2 and 3 above, with some modifications. One difference is that there are different computations for each set. That is, in some embodiments each chiplet computes a different PV for each set. The disparity or distance computations are also per set. That is, the individual chiplets compute and transmit as described above for stages 2 and 3, except on a per set basis. With this caveat, stage 2 may be performed on a per set basis as discussed above.

Regarding stage 3, most of stage 3 proceeds the same. That is, once the transmitted messages are authenticated, the chiplets of network 300 turn to computing the disparities among the various PV's transmitted within the network, as discussed above, but again on per set basis. The authentication of the transmissions occurs as discussed above. The disparities are computed as discussed above except that at the end each chiplet does not compute average disparities (e.g. average L2 squared distances), but instead uses a maximum function.

That is, in some embodiments, once the disparities (e.g. distances, squared distances, L2 squared distances, etc.) are computed for each set, instead of each chiplet computing the average of the disparities, the maximum disparity for each set is selected.

Example maximum distances (for each set) are shown in FIG. 7A. Thus, for set 1, the maximum distance is d1, for set 2, the maximum distance is d2, for set 3 the maximum distance is d3, for set 4 the maximum distance is d4, and for set 5 the maximum distance id d5. Next, the maximum of distances d1, d2, d3, d4, and d5 is obtained (Max (d1, d2, d3, d4, d5)). This Max value is then multiplied by (1*Δ) to arrive at the threshold T. This is shown in FIG. 7A as T=Max (d1, d2, d3, d4, d5)*(1+Δ), where Δ is a value that ranges between 0 and 1. In some particular embodiments, for the AES algorithm Δ is a value between 0.002 and 0.1, that is Δ∈[0.02, 0.1].

The value Δ is not fixed and is subject to adjustment within the above ranges. The value of Δ is related to two parameters, (1) speed of detection and (2) accuracy of detection. As the value of Δ increases, speed of detection decreases and accuracy of detection may increase and then start decreasing. And if the value of Δ decreases, speed of detection may increase and accuracy of detection may decrease.

In some embodiments, the equation is expressed more generally as, T=Max(S)*(1+Δ), where S is the set of maximum distances for each set. In the above example in which there are 5 sets, Max(S)=Max(d1, d2, d3, d4, d5). Once T is computed, the chiplets of the network are prepared for stages 2 and 3 above, but this time for purposes of detecting a cache-based SCA.

In the above discussion, it may appear that the sets (e.g. sets 1-5) are processed sequentially, that is not required. Indeed there are advantages to processing the data for the various sets concurrently. For example, processing of data for set 1 may occur while other data for set 1 is still be collected. And in another example, the chiplets may be in stage 2 or 3 for at least some of the data for set 1, while data for sets 2, 3, 4, or 5 is being concurrently collected.

A more specific example of calibration is how illustrated by FIG. 7B and chart 750. This example assumes that four sets have been executed (e.g. Set 1, Set 2, Set 3, and Set 4). Each set has its own set of computed intermediate distances d1, d2, d3, and d4.

Referencing Set 1, it is seen that intermediate distance d1 is the average of squared L2 distances dist 14, dist 12, and dist 13, that intermediate distance d2 is the average of squared L2 distances dist 24, dist 21, and dist 23. Further intermediate distance d3 is the average of dist31, dist 32, and dist34. And intermediate distance d4 is the average of dist 41, dist 42 and dist 43. For Set 2, Set 3, and Set 4, their respective intermediate distances d2, d3, and d4 are computed as discussed above for Set 1, but with data obtained from the respective sets.

Once the intermediate distances for each set are computed, then set S is computed. Set S is created by selecting the maximum (greatest value) of these intermediate distances for each set. As can be seen, d2 is selected (circled) for set S as the maximum intermediate distance for Set 1 because d2 is greater than d1, d3, or d4. Additionally, d3 is selected (circled) for set S as the maximum intermediate distance for Set 2, d1 is selected (circled) for set S as the maximum intermediate distance for set 3, and d2 is selected (circled) for set S as the maximum intermediate distance for set 4.

Once set S has been selected, then the maximum value is selected, which is indicated in FIG. 7B as d1 (circled). That is, Max(S)=d1. The maximum value d1 is then used in the formula T=d1*(1+Δ). The value Δ is discussed above. And therefore T is computed.

Some actual experiments are now discussed with reference to FIGS. 8-14. For the experiments described below, a simulation of a network of chiplets was provided by using cores of a multi-core processors in place of chiplets. The platform used was a Intel x86_64 architecture (Intel® Core™ i7-8565U CPU @ 1.80 GHz) with CPU op-mode(s): 32-bit, 64-bit, Address sizes: 39 bits physical, 48 bits virtual, CPU(s): 8, on-line CPU(s) list: 0-7, thread(s) per core: 2, Core(s) per socket: 4, CPU max MHz: 4600.0000, CPU min MHz: 400.0000.

Actual cache-based SCAs were executed, namely as attack called a Flush-Reload attack. The Flush-Reload attack was used against a victim AES algorithm and the attack was capable of successfully recovering the encryption key of the AES encryption. The victim process in the attacks was the OpenSSL version 1.1.1j which uses AES-128's t-table implementation. For every t-table AES is invoked 12,000 times to successfully conduct the attack. A Linux performance measuring tool called perf was used to collect Hardware Performance Counter (HPC) values. Five specific HPC events were monitored, specifically node-loads, cache-misses, LLC-load misses, LLC-loads, and L1-dcache-load misses. These five HPC events were found to be useful for distinguishing healthy chiplets from attacked ones.

In FIGS. 8 thru 12, there are four tables each. These all show a timeline in u seconds on a horizontal axis and HPC events (heart beat data) on a vertical axis. A top row of tables shows data during an attack and a bottom row shows data when no attack is taking place.

Figure 8:
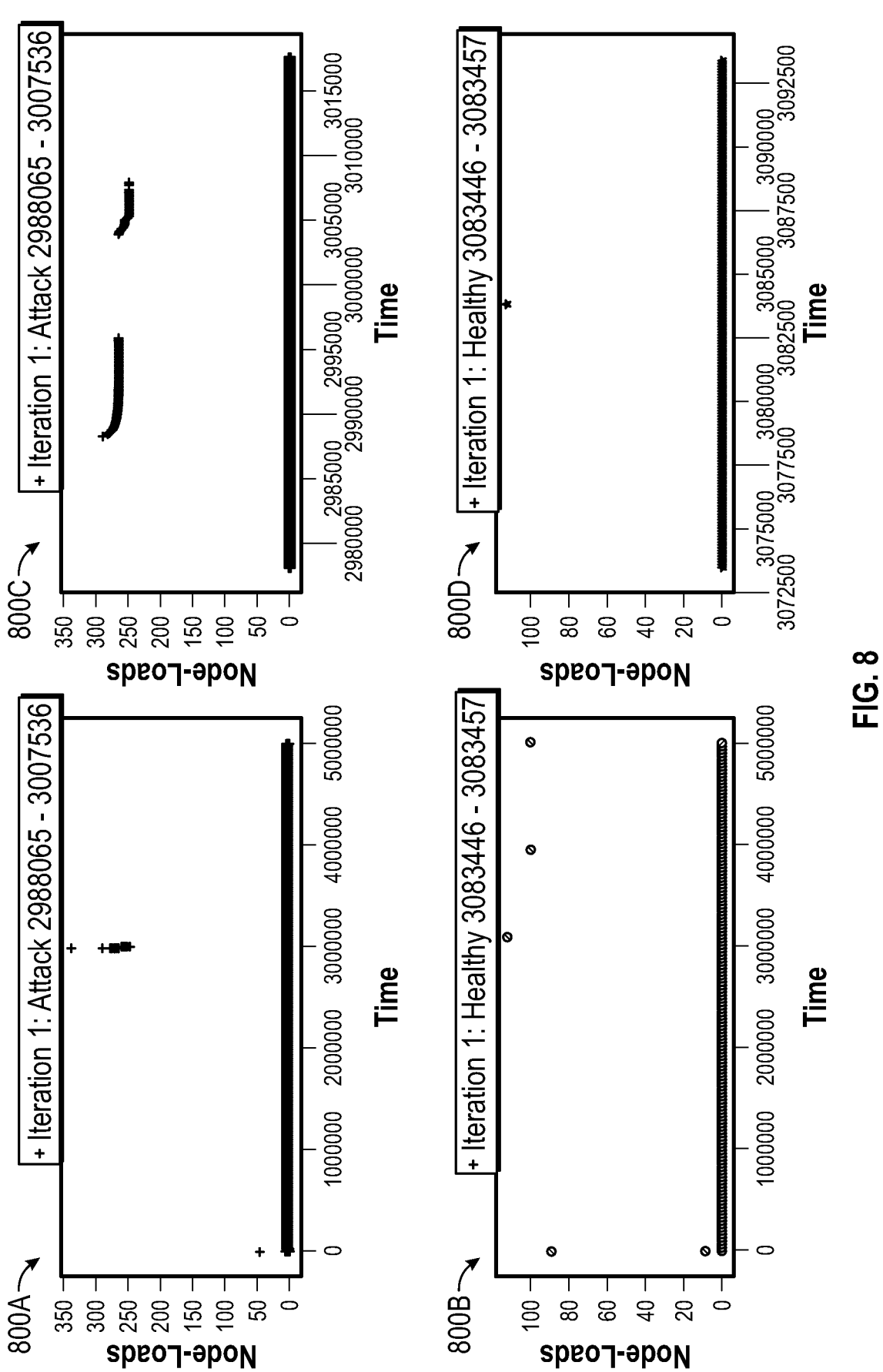
FIG. 8 is a collection of tables, consistent with some embodiments, showing node-load data collected from a chiplet, with the top row of tables showing node-load activity that is indicative of a cache-based SCA and the bottom row of tables showing node-load activity that is not indicative of an attack.

Referencing FIG. 8, tables 800A-800D each show the behavior of node-loads HPC event. For each table, the vertical axis shows the node-loads event counts measured by Perf and the horizontal axis is a timeline (u second scale) of measurement. On the right side of FIG. 8, tables 800C and 800D show a close-up version of portions of the left side tables, tables 800A and 800B. The top tables, tables 800A and 800C, show node-loads when an attack is occurring, with table 800C showing a closeup of the timeframe in which an attack occurred. The bottom tables, tables 800B and 800D. show node-loads when no attack is occurring.

Referencing table 800A, there is an increased number (about 250) of node-loads event from 2988065µ seconds to 3007536µ seconds. These increased events are indicative of an actual cache-based SCA. Referencing FIG. 800C, the closeup shows the above portion of the timeline in closeup. In contrast, referencing tables 800B and 800D, no attack is taking place. During the timeline between 3083446 u seconds to 3083457µ seconds, there is no increased node-loads activity taking place, either in table 800B or in closeup in table 800D. Thus, a clear difference is seen in tables 800A and 800C which depict increased node-loads during an attack and 800B and 800D which show comparatively fewer node-loads when no attack is taking place.

Figure 9:
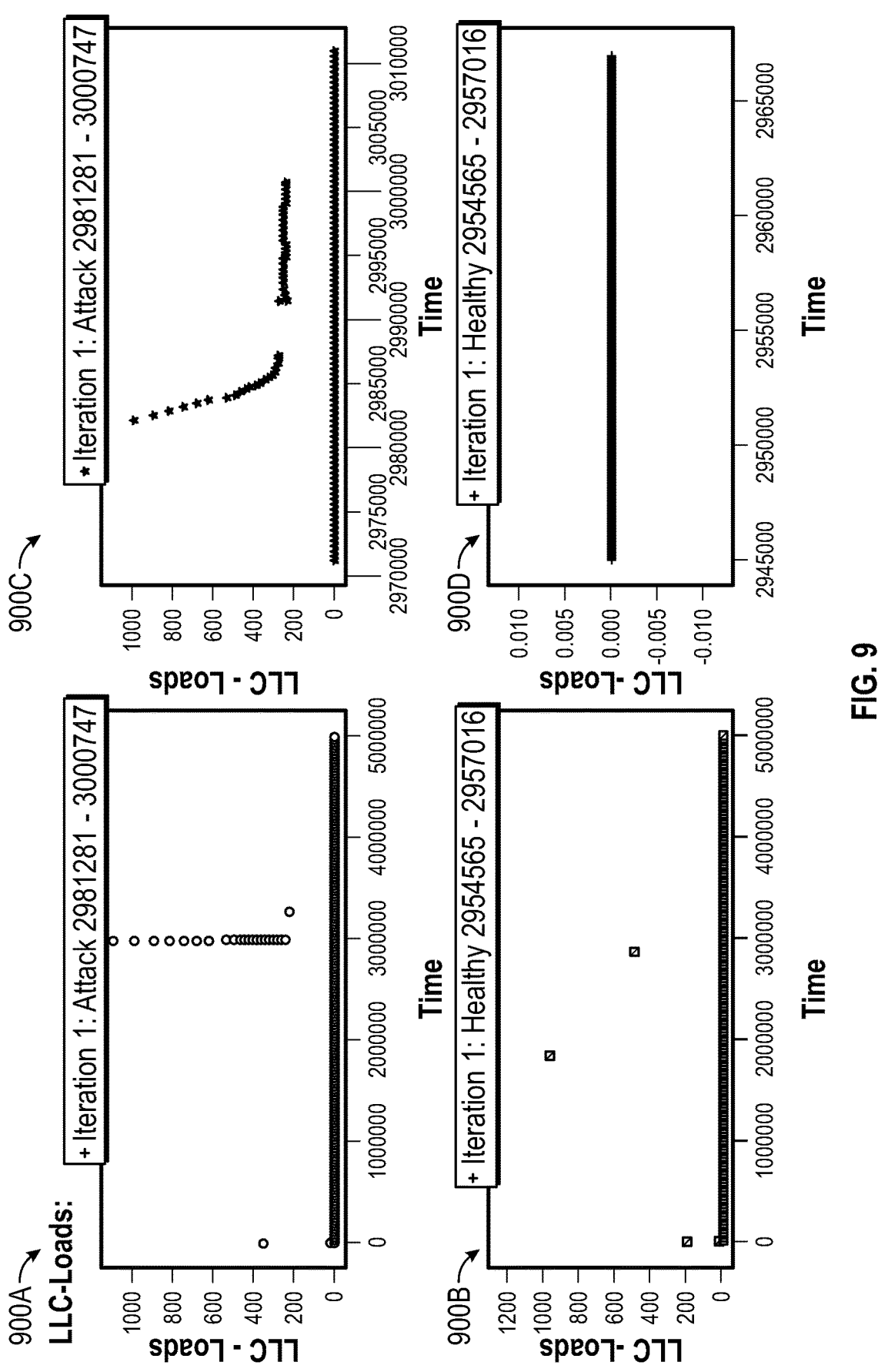
FIG. 9 is a collection of tables, consistent with some embodiments, showing lower-level cache load (LLC-loads)

Referencing, FIG. 9, tables 900A-900D show LLC-loads activity (as measured against vertical axes) with a cache-based SCA (tables 900A and 900C) and without a cache-based SCA (tables 900B and 900D). The timeline of the cache-based SCA on tables 900A and 900C is between 2981281 to 3000747 u seconds. The timeline in which the attack takes place is shown in closeup in table 900C. And tables 900B and 900D show the tracking of LLC-loads activity when no attack is taking place. Again, a clear difference is seen in tables 900A and 900C which depict increased LLC-loads activity during an attack and 900B and 900D which show comparatively less LLC-loads activity when no attack is taking place.

Referencing, FIG. 10, tables 1000A-1000D show L1-dcache-load-misses activity (as measured against vertical axes) with a cache-based SCA (tables 1000A and 1000C) and without a cache-based SCA (tables 1000B and 1000D). The timeline of the cache-based SCA in tables 1000A and 1000C is between 2987531 to 3807875 u seconds. The timeline in which the attack takes place is shown in closeup in table 1000C. And tables 1000B and 1000D show the tracking of L1-dcache-load-misses activity when no attack is taking place. Again, a clear difference is seen in tables 1000A and 1000C which depict increased L1-dcache-load-misses during an attack and 1000B and 1000D which show comparatively fewer L1-dcache-load-misses when no attack is taking place.

Referencing, FIG. 11, tables 1100A-1100D show cache-misses activity (as measured against vertical axes) with a cache-based SCA (tables 1100A and 1100C) and without a cache-based SCA (tables 1100B and 1100D). The timeline of the cache-based SCA on tables 1100A and 1100C is between 2986184 to 3005225 u seconds. The timeline in which the attack takes place is shown in closeup in table 1100C. And tables 1100B and 1100D show the tracking of cache-misses activity when no attack is taking place. Again, a clear difference is seen in tables 1100A and 1100C which depict increased cache-misses during an attack and 1100B and 1100D which show comparatively fewer cache-misses when no attack is taking place.

Referencing, FIG. 12, tables 1200A-1200D show LLC-load-misses activity (as measured against vertical axes) with a cache-based SCA (tables 1200A and 1200C) and without a cache-based SCA (tables 1200B and 1200D). The timeline of the cache-based SCA on tables 1200A and 1200C is between 2987931 to 3007875 u seconds. The timeline in which the attack takes place is shown in closeup in table 1200C. And tables 1200B and 1200D show the tracking of LLC-load-misses activity when no attack is taking place. Again, a clear difference is seen in tables 1200A and 1200C which depict increased LLC-load-misses during an attack and 1200B and 1200D which show fewer LLC-load-misses when no attack is taking place.

Referencing FIGS. 13A and 13B, tables 1300A and 1300B show results of an experiment in which an actual cache-based SCA was detected. Charts 1300A and 1300B show the activity of simulated chiplets (cores) during an actual cache-based SCA. In tables 1300A and 1300B, the horizontal axis shows a timeline indicating time slices of 150μ seconds each. Each time slice is a time period during which states 2-4 were executed. The vertical axes indicate average distance dn (see discussion of dn above) associated with the 5 chiplets. In this experiment, the attacked chiplet was chiplet 1 (core 2). The healthy chiplets were core 0 (chiplet 2), core 3 (chiplet 3) core 5 (chiplet 4), and core 6 (chiplet 5).

Referencing table 1300 A, there is a spike in the dn values for all chiplets centered around time slice 20000. But the spike for chiplet 1 (shown via curve 1302A) is much higher than the others. This pattern persists when seen (shown via curve 1302B) closeup in Chart 1300B. Thus, a clear difference appears in the comparison of the dn for chiplet 1 (core 2) versus the dn for the other chiplets.

The average peak distances for the chiplets were 4893.513140982821 for core 2 (chiplet 1—the attacked chiplet) and for core 0 (chiplet2) 1237.5240109408687, for core 3 (chiplet 3) 1194.324125401421, for core 5 (chiplet 4) 1230.362340200428, and for core 6 (chiplet 5) 1237.3472948424146. The lowest computed threshold T is 943.501823842529 if A is 0, 990.676915035 if A is 0.05, and 1037.85200623 if A is 0.1. With a peak average of 4893.513140982821, Chiplet 1 is above T and therefore detected as an attacked chiplet. On review of the data, all chiplets are ultimately above T, but chiplet 1 is detected as the attacked chiplet because it exceeded T first. That is, the first chiplet to exceed T is detected as the attacked chiplet.

In addition to detecting an attack, the detection must be in time to prevent a cache-based SCA from successfully stealing the secret key SK of the attacked chiplet. Accordingly, in some embodiments, an attack is detected in the first time slice in which a chiplet's dn measurement exceeds the threshold T. In the above case studies and experiments, an attack requires about 20 msec to successfully recover SK. Therefore, the goal is to make the detection in less than 20 msec.

Referencing FIG. 14, the timing of the detection in the above experiment are discussed. Table 1400 has column 1402 showing the sizes of A, column 1404 showing time instants when an attack was detected, column 1406 showing average distance dn at the time of the detection in column 1404, column 1408 indicating by a check mark that a detection of an attack was made, and column 1410 showing a time of detection is msec. The time in column 1410 is since the beginning of the attack.

The accuracy and the speed of the detection of the attack depends on the setting of 4. Accordingly, the rows of table 1400 depict data with different settings for A. Thus, row 1420 shows data when A is 0, row 1422 shows data when A is 0.05, and row 1424 shows data when A is 0.1.

Initially, from rows 1420 and 1422 it may be seen that the data is identical regardless of whether A is 0 or 0.05. In both cases, the time instant of detection is 19999, the average distance of the attacked chiplet is 994.6760342345376, and the time required to detect the attack was 7.35 msec., well under the goal of 20 msec. When Δ is 0.1, the instant of detection is later at 20002, the average distance dn of the attacked chiplet at the time of detection is greater at 1325.095919639944, and the time needed to detect the attack is 7.8 msec. Thus for all settings of 4, the time needed to detect an attack is less than the goal of 20 msec.

FIGS. 15A-15E illustrate exemplary methods that are capable of being performed in one or more of the physical environments illustrated in other drawings. However, the exemplary methods are not limited to the disclosed physical environments and may be performed in a variety of other physical environments. In addition, although the exemplary methods have steps or operations that are illustrated as being performed in certain orders or sequences, it should be understood that at least some of the illustrated steps and orders may be performed in different orders or sequences or may be performed concurrently. Additionally, not all embodiments require all steps or operations, as will be apparent to those of skill in the art, some steps or operations are optional in some embodiments.

Referencing FIG. 15A, an exemplary method 1500 detects and interrupts at least a cache-based SCA. In some embodiments, method 1500 is a method of detecting and interrupting a cache-based SCA and is performed with a network of chiplets.

Method 1500 optionally begins with operation 1510 which calibrates one or more chiplets (e.g. chiplets 200A-200D) of the network (e.g. chiplet network 300) of chiplets by at least calculating a threshold (e.g. threshold 247), the threshold being calculated dependent upon at least a type of security algorithm (e.g. AES, RSA, etc.) being executed by the one or more of the chiplets. Operation 1510 may, in some embodiments, be replaced by entering the threshold as a user setting. In other embodiments, operation 1510 is only run when there is a need to compute a threshold for a different security algorithm (e.g. when changing from AES to RSA, etc.). In some embodiments, operation 1510 is performed at least in part with calibration circuit 252). For example, dedicated processor 204 may access calibration circuit 252 for executable code to perform operation 1510, including receiving input from one or more HPC 234, DVFS 236, or SPC 255.

While the above discussion has discussed AES and RSA, some embodiments are applicable to use security algorithms that utilize a secret key which needs to be protected. Therefore, some embodiments are applicable, without limitation, to one or more of (i) symmetric security algorithms such as AES, (ii) symmetric authentication algorithms such as HMAC, (iii) Asymmetric encryption algorithms, such as for example, RSA, Diffie-hellman key exchange, Elgamal, and Elliptic Curve Cryptographic encryption, (iv) asymmetric authentication algorithms such as for example digital signature algorithm (DSA), elliptic curve digital signature algorithm (ECDSA) and (v) network Security algorithms such as for example Transport Layer Security (TLS) and Datagram Transport Layer Security (DTLS).

Control moves to operation 1540 which determines one or more device heartbeat vectors (e.g. a processed vector such as PV 460) of the one or more chiplets. The one or more device heartbeat vectors being derived at least part from one or more measurements of activity (e.g. heartbeat data 263, such as for example one or more of node loads, cache misses, etc.) of one of more dedicated security processors (for example dedicated processor 204) associated with the one or more chiplets. In some embodiments, operation 1540 is performed at least in part with heartbeat determination circuit 268. For example, dedicated processor 204 may access heartbeat determination circuit 268 for executable code to perform operation 1540, including receiving input from one or more HPC 234, DVFS 236, or SPC 255 and processing obtained heartbeat data into a processed vector (PV) 265.

Control then moves to operation 1560 which determines that a particular chiplet of the one or more chiplets is being attacked with a cache-based SCA. The determining being based at least in part on a computed disparity (e.g. computed disparity 267, such as for example an L2 squared distance) exceeding the threshold (e.g. threshold 247), the computed disparity being computed based at least in part on one or more disparities between at least one or more device heartbeat vectors (e.g. PV(s) 265) associated with the particular chiplet and one or more other device heartbeat vectors (PV(s) 265) associated with others of the one or more chiplets. In some embodiments, operation 1560 is performed at least in part with SCA determination circuit 274. For example, dedicated processor 204 may access SCA determination circuit 274 for executable code to perform operation 1560, including computing disparities among computed and received PVs, deriving average disparities 265, and comparing average disparities 265 to a threshold 247.

Control moves to operation 1580 which employs one or more countermeasures against the cache-based SCA of the particular chiplet. The countermeasures including at least revoking one or more access rights of the particular chiplet on the network. In some embodiments, operation 286 is performed at least in part with countermeasures circuit 286. For example, dedicated processor 204 may access countermeasures circuit 286 for executable code to perform operation 1580.

In some embodiments, operation 1510 optionally includes one or more of operations 1511, 1512, 1514, 1516, 1522, or 1524.

Operation 1511 includes with the one or more dedicated security processors executing multiple iterations of a security algorithm, such as for example AES or RSA. In some embodiments, operation 1511 is performed at least in part with SA (security algorithm) execution circuit 253. For example, dedicated processor 204 may access executable code associated with SA execution circuit 253 to execute multiple iterations of a security algorithm.

Operation 1512 includes detecting one or more device heartbeats of the one or more dedicated security processors. In some embodiments, operation 1512 further includes at least detecting one or more device heartbeats that include at least one of node-loads, cache misses, LLC-load misses, LLC-loads, or L1-dcache-load-misses, using at least one of a hardware performance counter (HPC), a dynamic voltage and frequency scaling circuit (DVFS), or a software performance counter (SPC). In some embodiments, additional tools such as PAPI, Permon, or other tool is used to assist with gathering the data. In some embodiments, operation 1512 is performed at least in part with heartbeat determination circuit 254.

Operation 1514 includes calculating one or more device heartbeat vectors based at least in part upon the one or more device heartbeats. In some embodiments operation 1514 further includes at least processing the one or more device heartbeats in one or more vectors associated with the one or more dedicated security processors. And in some further embodiments, operation 1514 further includes at least for at least a given chiplet of the one or more chiplets, simplifying one or more device heartbeat vectors associated with the given chiplet into a single device heartbeat vector for the given chiplet. In some embodiments, operation 1514 is performed with vector determination circuit 256. For example, dedicated processor 204 may access vector determination circuit 256 for executable code to perform operation 1514, accessing a matrix (e.g. matrix 400), processing the matrix into an intermediate vector (e.g. vector 440), and processing an intermediate vector into a processed vector (PV) 460.

Operation 1516 includes distributing the one or more device heartbeat vectors among the one or more chiplets of the network. In some embodiments, operation 1516 is performed at least in part with vector distribution circuit 258. For example, dedicated processor 204 may access executable code in vector distribution circuit 258 and may further access revocation key RK to compute an HMAC on a concatenation of a PV and a timestamp: HMAC (RK, PV‖timestamp).

Operation 1522 includes determining one or more disparities among the one or more device heartbeat vectors. In some embodiments, operation 1522 is performed at least in part with disparity determination circuit 264. For example, dedicated processor 204 may access disparity determination circuit 264 for executable code to perform operation 1522, including computing disparities among computed and received PVs and deriving average disparities 265.

Operation 1524 includes calculating the threshold dependent, at least in part, on the one or more disparities. In some embodiments, operation 1524 is performed at least in part with threshold calculation circuit 266. For example, in some embodiments, dedicated processor 204 may access a maximum function from threshold determination circuit 266 and use the maximum function to obtain a maximum disparity dm of a set of disparities (e.g. from FIG. 7A: Max (d1, d2, d3, d4, d5). In some further embodiments, dedicated processor 204 obtains a threshold calculation function (e.g. Threshold=Max (d1, d2, d3, d4, d5)*(1+Δ)) and calculates threshold T.

In some embodiments, operation 1516 optionally includes one or more of operations 1518 or 1520.

Operation 1518 includes calculating one or more MAC's on the one or more device heartbeat vectors at least in part with a revocation key associated with all of the one or more chiplets. In some further embodiments, operation 1518 further includes transmitting the one or more device heartbeat vectors and the one or more MAC's throughout the network, wherein a first chiplet of the one or more chiplets transmits to all others of the one or more chiplets a first device heartbeat vector associated with the first chiplet and a first MAC computed on the first device heartbeat vector. In some embodiments, operation 1518 is performed at least in part with message computation and broadcast circuit 260 performing actions described above relative to FIG. 5A.

Operation 1520 includes at least authenticating the transmitted one or more device heartbeat vectors and the one or more MAC's, a second chiplet of the one or more chiplets authenticating at least the first device heartbeat vector and the first MAC at least in part with at least one of a status table or the revocation key. In some embodiments, operation 1520 is performed at least in part with message authentication circuit 262. For example, dedicated processor 204 accesses executable code in message authentication circuit 262 and then obtains chiplet status table 246 and determines a status (e.g. valid or invalid) of a chiplet that sent a device heartbeat vector and an HMAC. The dedicated processor 204 may then access its revocation key RK 242 to verify the authenticity of the HMAC.

In some embodiments, operation 1540 optionally includes one or more of operation 1542 or operation 1544.

Operation 1542 includes detecting one or more device heartbeats of the one or more dedicated security processors. In some embodiments, operation 1542 further includes at least wherein the one or more performance measurements including measurements of at least one of node-loads, cache misses, LLC-load misses, LLC-loads, or L1-dcache-load-misses, with at least one of a hardware performance counter (HPC), a dynamic voltage and frequency scaling circuit (DVFS), or a software performance counter (SPC). In some embodiments, operation 1542 is performed at least in part with heartbeat detection circuit 270.

Operation 1544 includes determining one or more device heartbeat vectors based at least in part upon the one or more device heartbeats. In some embodiments, operation 1544 further includes at least processing the one or more device heartbeats into one or more vectors wherein individual vectors of the one or more vectors are associated with individual chiplets of the one or more chiplets. In some further embodiments, operation 1544 further includes at least for at least a given chiplet of the one or more chiplets, simplifying one or more vectors associated with the given chiplet into a single device heartbeat vector for the given chiplet. In some embodiments, operation 1544 is performed at least in part with vector determination circuit 272. For example, dedicated processor 204 may access vector determination circuit 272 for executable code to perform operation 1544, accessing a matrix (e.g. matrix 400), processing the matrix into an intermediate vector (e.g. vector 440), and processing an intermediate vector into a processed vector (PV) 460.

In some embodiments, operation 1560 optionally includes one or more or operation 1562, 1570, or 1572.

Operation 1562 includes distributing the one or more device heartbeat vectors among the one or more chiplets of the network. In some embodiments, operation 1562 is performed at least in part with vector distribution circuit 276. For example, dedicated processor 204 may access executable code in vector distribution circuit 276 and may further access revocation key RK to compute an HMAC on a concatenation of a PV and a timestamp: HMAC (RK, PV‖timestamp).

Operation 1570 includes at least determining one or more disparities among the one or more device heartbeat vectors. In some embodiments, operation 1570 further includes at least computing one or more squared distances between the device heartbeat vectors of the one or more chiplets of the network, including at least computing one or more squared distances between (1) a given device heartbeat vector associated with a given chiplet of the one or more chiplets and (2) with individual device heart beat vectors associated with all of the chiplets of the one or more chiplets. And in some further embodiments, operation 1570 further includes at least averaging the computed squared distances to generate an average squared distance for each chiplet of the one or more chiplets, including at least averaging all squared distances associated with the given chiplet to achieve a single given squared distance associated with the given chiplets. In some embodiments, operation 1570 is performed at least in part with disparity determination circuit 282. For example, dedicated processor 204 may access disparity determination circuit 282 for executable code to perform operation 1570, including computing disparities among computed and received PVs and deriving average disparities 265.

Operation 1572 includes at least detecting a cache-based SCA of one or more particular chiplets based on one or more disparities of the one or more particular chiplets exceeding the threshold. In some embodiments, operation 1572 is performed at least in part with SCA attack determination circuit 284. For example, in some embodiments dedicated processor accesses SCA attack determination circuit 284, threshold 247, and average disparities 267 to determine if a chiplet is under a cache-based SCA.

In some embodiments, operation 1562 optionally includes one or more of operation 1564 or 1566.

Operation 1564 includes at least calculating one or more MAC's using one or more device heartbeat vectors at least in part with a revocation key associated with all of the one or more chiplets. In some embodiments, operation 1564 further includes at least transmitting the one or more device heartbeat vectors and the one or more MAC's throughout the network, wherein a first chiplet of the one or more chiplets transmits to all others of the one or more chiplets a first device heartbeat vector associated with the first chiplet and a first MAC computed on the first heartbeat vector. In some embodiments, operation 1564 is performed at least in part with message computation and broadcast circuit 278 performing actions described above relative to FIG. 5A.

Operation 1566 includes at least authenticating the transmitted one or more device heartbeat vectors and the one or more MAC's, a second chiplet of the one or more chiplets authenticating at least the first device heartbeat vector and the first MAC at least in part with at least one of a status table or the revocation key. In some embodiments, operation 1566 is performed at least in part with message authentication circuit 280. For example, dedicated processor 204 accesses executable code in message authentication circuit 280 and then obtains chiplet status table 246 and determines a status (e.g. valid or invalid) of a chiplet that sent a device heartbeat vector and an HMAC (an example of a MAC). The dedicated processor 204 may then access its revocation key RK 242 to verify the authenticity of the HMAC.

In some embodiments, operation 1580 optionally includes one or more of operation 1582, operation 1584, or 1586.

Operation 1582 includes at least causing the all of the one or more chiplets, except for the particular chiplet, to indicate the particular chiplet with a invalid status on one or more tables. In some embodiments, operation 1582 is performed at least in part with status invalidation circuit 288. For example, in some embodiments, dedicated processor 204 accesses status invalidation circuit 288 to obtain executable code and further accesses chiplet status table 246 and changes a status (e.g. status indicator 604A) of an attacked chiplet to invalid (for example, to '0', indicating invalid status).

Operation 1584 includes at least causing the particular chiplet to destroy its identity in the network, as least in part by causing the particular chiplet to destroy a key. In some embodiments, operation 1584 is performed at least in part with chiplet self-destruct circuit 290. For example, in some embodiments a dedicated processor 204 of an attacked chiplet accesses executable code in chiplet self-destruct circuit 290 and causes a true random number generator (e.g. TRNG 210) to generate a new random number r(211), accesses revocation key 242, encrypts revocation key 242 using r(211) as the encryption key, and then clears r(211) from memory (e.g. from a register).

Operation 1586 includes at least causing the all of the one or more chiplets, except for the particular chiplet, to recompute a key that is associated with access rights in the network. In some embodiments, operation 1586 is performed at least in part with revocation key re-computation circuit 292. For example, in some embodiments dedicated processor 204 of a non-attacked chiplet accesses executable code from revocation key re-computation circuit 292 and then accesses revocation key 242, accesses PRNG 205, and using the revocation key 242 as a seed causes PRNG 205 to generate a new revocation key.

It will be understood by those skilled in the art that the terminology used in this specification and in the claims is "open" in the sense that the terminology is open to additional elements not enumerated. For example, the word "includes" should be interpreted to mean "including at least" and so on. Even if "includes at least" is used sometimes and "includes" is used other times, the meaning is the same: includes at least. In addition, articles such as "a" or "the" should be interpreted as not referring to a specific number, such as one, unless explicitly indicated. At times a convention of "at least one of A, B, or C" is used, the intent is that this language includes any combination of A, B, C, including, without limitation, any of A alone, B alone, C alone, A and B, B and C, A and C, all of A, B, and C or any combination of the foregoing, such as for example AABBC, or ABBBCC. The same is indicated by the conventions "one of more of A, B, or C" and "and/or".

In addition, references to circuits, such as for example calibration circuit, heartbeat determination circuit, SCA determination circuit, or countermeasures circuit, refer to circuitry for causing a chiplet to perform the respective functions of these circuits. In some embodiments, one or more of these circuits are implemented as sub-chiplets. In some embodiments, these circuits include at least one of executable code stored on a machine-readable medium (e.g. Secure NVM 208), an application, a field-programmable gate array (FPGA), an application-specific integrated circuit (ASIC), memories storing executable code, other forms of logic or any combination of the foregoing. In some embodiments, these circuits include are part of and/or include a link to dedicated processor. In embodiments in which one or more circuits includes executable code stored in a machine-readable medium, this executable code, when executed, would cause the dedicated processor to perform the respective functions of the circuit. Consistent with the above discussion, in some embodiments, these circuits may be part of a processing device, such as a CPU, a processor, a controller, a field-programmable gate array, or hard-wired logic. In some embodiments one or more circuits may contain memory, may be configured to access stored memory, may be configured to access remote memory, or may not contain or access memory, dependent on their function. In some embodiments, one or more circuits contain or are linked to one or more machine-readable mediums (e.g. NVM 208).

Various functional logic blocks, such as for example, an AI engine or a ML engine may, in some embodiments, be implemented as circuits. And the above discussion of circuits would be fully applicable.

Although embodiments have been described in detail, it should be understood that various changes, substitutions, and alterations could be made hereto without departing from the spirit and scope of the invention as defined by the appended claims and equivalents thereof.

We claim:

1. A method for detecting and interrupting a cache-based side-channel attack performed with a network of chiplets, the method comprising:

determining one or more device heartbeat vectors of the one or more chiplets, the one or more device heartbeat vectors being derived at least part from one or more measurements of activity of one of more dedicated security processors associated with the one or more chiplets;

determining that a particular chiplet of the one or more chiplets is being attacked with a cache-based side-channel attack, the determining being based at least in part on a computed disparity exceeding a threshold, the computed disparity being computed based at least in part on one or more disparities between at least one or more device heartbeat vectors associated with the particular chiplet and one or more other device heartbeat vectors associated with others of the one or more chiplets;

employing countermeasures against the cache-based side-channel attack of the particular chiplet, the countermeasures including at least revoking one or more access rights of the particular chiplet on the network;

calibrating one or more chiplets of the network of chiplets by at least calculating a threshold, the threshold being calculated dependent upon at least a type of security algorithm being executed by the one or more of the chiplets;

the calibrating one or more chiplets of the network of chiplets by at least calculating a threshold, the threshold being calculated dependent upon at least a type of security algorithm being executed by the one or more of the chiplets comprises:

with the one or more dedicated security processors executing multiple iterations of a security algorithm;

detecting one or more device heartbeats of the one or more dedicated security processors;

calculating one or more device heartbeat vectors based at least in part upon the one or more device heartbeats;

distributing the one or more device heartbeat vectors among the one or more chiplets of the network;

determining one or more disparities among the one or more device heartbeat vectors; and calculating the threshold dependent, at least in part, on the one or more disparities;

wherein the distributing the one or more device heartbeat vectors among the one or more chiplets of the network comprises:

calculating one or more Message Authentication Codes (MAC) s on the one or more device heartbeat vectors at least in part with a revocation key associated with all of the one or more chiplets;

transmitting the one or more device heartbeat vectors and the one or more MACs throughout the network, wherein a first chiplet of the one or more chiplets transmits to all others of the one or more chiplets a first device heartbeat vector associated with the first chiplet and a first MAC computed on the first device heartbeat vector; and authenticating the transmitted one or more device heartbeat vectors and the one or more MACs, a second chiplet of the one or more chiplets authenticating at least the first device heartbeat vector and the first MAC at least in part with at least one of a status table or the revocation key.

2. The method of claim 1, wherein the detecting one or more device heartbeats of the one or more dedicated security processors comprises:

detecting one or more device heartbeats that include at least one of node-loads, node-stores, top-down-fetch-bubbles, cache-references, branch-load-misses, branches, data translation lookaside buffer (DTLB) stores, data translation lookaside buffer (DTLB) store-misses, CPU-cycles, bus-cycles, cache misses, level 1 (L1) data cache misses, level 1 (L1) instruction cache misses, level 1 (L1) total cache misses, level 1 (L1) dcache-load-misses, level 2 (L2) instruction cache accesses, level 2 (L2) instruction cache misses, level 2 (L2) total cache accesses, level 2 (L2) total cache misses, level 3 (L3) instruction cache accesses, level 3 (L3) total cache accesses, level 3 (L3) total cache misses, system-wide total CPU cycles, last-level cache (LLC) load misses, last-level cache (LLC) loads, system-wide branch miss-predictions, or system-wide total page faults, wherein the detecting is performed at least in part by using at least one of a hardware performance counter (HPC), a dynamic voltage and frequency scaling circuit (DVFS), or a software performance counter (SPC).

3. The method of claim 1, wherein the calculating one or more device heartbeat vectors based at least in part upon the one or more device heartbeats comprises:

processing the one or more device heartbeats in one or more vectors associated with the one or more dedicated security processors; and for at least a given chiplet of the one or more chiplets, simplifying one or more device heartbeat vectors associated with the given chiplet into a single device heartbeat vector for the given chiplet.

4. The method of claim 1, wherein the type of security algorithm is at least one of advanced encryption standard (AES), Rivest-Shamir-Adleman (RSA) cryptographic systems, hash-based message authentication code (HMAC), Diffie-Hellman key exchange, ElGamal cryptography, Elliptic Curve Cryptographic encryption, digital signature algorithm (DSA), elliptic curve digital signature algorithm (ECDSA), Transport Layer Security (TLS), or Datagram Transport Layer Security (DTLS).

5. The method of claim 1, wherein the determining one or more device heartbeat vectors of the one or more chiplets, the one or more device heartbeats being derived at least in part from one or more measurements of activity of one of more dedicated security processors associated with the one or more chiplets comprises:

detecting one or more device heartbeats of the one or more dedicated security processors.

6. The method of claim 5, wherein the detecting one or more device heartbeats of the one or more dedicated security processors comprises:

wherein the one or more performance measurements including measurements of at least one of node-loads, cache misses, LLC-load misses, LLC-loads, or L1-dcache-load-misses, with at least one of a hardware performance counter (HPC), a dynamic voltage and frequency scaling circuit (DVFS), or a software performance counter (SPC).

7. The method of claim 1, wherein the determining one or more device heartbeat vectors of the one or more chiplets, the one or more device heartbeat vectors being derived at least part from one or more measurements of activity of one of more dedicated security processors associated with the one or more chiplets comprises:

determining one or more device heartbeat vectors based at least in part upon the one or more device heartbeats.

8. The method of claim 7, wherein the determining one or more device heartbeat vectors based at least in part upon the one or more device heartbeats comprises:

processing the one or more device heartbeats into one or more vectors wherein individual vectors of the one or more vectors are associated with individual chiplets of the one or more chiplets; and for at least a given chiplet of the one or more chiplets, simplifying one or more vectors associated with the given chiplet into a single device heartbeat vector for the given chiplet.

9. The method of claim 1, wherein the determining that a particular chiplet of the one or more chiplets is being attacked with a cache-based side-channel attack comprises:

distributing the one or more device heartbeat vectors among the one or more chiplets of the network.

10. The method of claim 9, wherein the distributing the one or more device heartbeat vectors among the one or more chiplets of the network comprises:

calculating one or more Message Authentication Codes (MACs) one the one or more device heartbeat vectors at least in part with a revocation key associated with all of the one or more chiplets;

transmitting the one or more device heartbeat vectors and the one or more MACs throughout the network, wherein a first chiplet of the one or more chiplets transmits to all others of the one or more chiplets a first device heartbeat vector associated with the first chiplet and a first MAC computed on the first heartbeat vector; and authenticating the transmitted one or more device heartbeat vectors and the one or more MACs, a second chiplet of the one or more chiplets authenticating at least the first device heartbeat vector and the first MAC at least in part with at least one of a status table or the revocation key.

11. The method of claim 1, wherein determining that a particular chiplet of the one or more chiplets is being attacked with a cache-based side-channel attack, the determining being based at least in part on a computed disparity exceeding the threshold, the computed disparity being computed based at least in part on one or more disparities between at least one or more device heartbeat vectors associated with the particular chiplet and one or more other device heartbeat vectors associated with others of the one or more chiplets comprises:

determining one or more disparities among the one or more device heartbeat vectors.

12. The method of claim 11, wherein the determining one or more disparities among the one or more device heartbeat vectors comprises:

computing one or more squared distances between the device heartbeat vectors of the one or more chiplets of the network, including at least computing one or more squared distances between (1) a given device heartbeat vector associated with a given chiplet of the one or more chiplets and (2) with individual device heart beat vectors associated with all of the chiplets of the one or more chiplets; and averaging the computed squared distances to generate an average squared distance for each chiplet of the one or more chiplets, including at least averaging all squared distances associated with the given chiplet to achieve a single given squared distance associated with the given chiplets.

13. The method of claim 1, wherein the determining that a particular chiplet of the one or more chiplets is being attacked with a cache-based side-channel attack, the determining being based at least in part on a computed disparity exceeding the threshold, the computed disparity being computed based at least in part on one or more disparities between at least one or more device heartbeat vectors associated with the particular chiplet and one or more other device heartbeat vectors associated with others of the one or more chiplets comprises:

detecting a side-channel attack of one or more particular chiplets based on one or more disparities of the one or more particular chiplets exceeding the threshold.

14. The method of claim 1, wherein employing countermeasures against the cache-based side-channel attack of the particular chiplet, the countermeasures including at least revoking one or more access rights of the particular chiplet on the network comprises:

at least one of:

causing the particular chiplet to destroy its identity in the network, as least in part by causing the particular chiplet to destroy a key; or causing the all of the one or more chiplets, except for the particular chiplet, to recompute a key that is associated with access rights in the network.

15. A method for detecting and interrupting a cache-based side-channel attack performed with a network of chiplets, the method comprising:

determining one or more device heartbeat vectors of the one or more chiplets, the one or more device heartbeat vectors being derived at least part from one or more measurements of activity of one of more dedicated security processors associated with the one or more chiplets;

determining that a particular chiplet of the one or more chiplets is being attacked with a cache-based side-channel attack, the determining being based at least in part on a computed disparity exceeding a threshold, the computed disparity being computed based at least in part on one or more disparities between at least one or more device heartbeat vectors associated with the particular chiplet and one or more other device heartbeat vectors associated with others of the one or more chiplets; and employing countermeasures against the cache-based side-channel attack of the particular chiplet, the countermeasures including at least revoking one or more access rights of the particular chiplet on the network;

wherein employing countermeasures against the cache-based side-channel attack of the particular chiplet, the countermeasures including at least revoking one or more access rights of the particular chiplet on the network comprises:

causing the all of the one or more chiplets, except for the particular chiplet, to indicate the particular chiplet with an invalid status on one or more tables.

16. A network of chiplets that includes one or more chiplets, the one or more chiplets comprising:

one or more machine-readable mediums bearing one or more executable instructions that configure the one or more chiplets to execute at least the following operations:

(1) calibrating one or more chiplets of the network of chiplets by at least calculating a threshold, the threshold being calculated dependent upon at least a type of security algorithm being executed by the one or more of the chiplets;

(2) determining one or more device heartbeat vectors of the one or more chiplets, the one or more device heartbeat vectors being derived at least part from one or more measurements of activity of one of more dedicated security processors associated with the one or more chiplets;

(3) determining that a particular chiplet of the one or more chiplets is being attacked with a cache-based side-channel attack, the determining being based at least in part on a computed disparity exceeding the threshold, the computed disparity being computed based at least in part on one or more disparities between at least one or more device heartbeat vectors associated with the particular chiplet and one or more other device heartbeat vectors associated with others of the one or more chiplets; and (4) employing countermeasures against the cache-based side-channel attack of the particular chiplet, the countermeasures including at least revoking one or more access rights of the particular chiplet on the network;

distributing one or more device heartbeat vectors associated with the particular chiplet having the one or more disparities among one or more chiplets of the network;

wherein the distributing the one or more device heartbeat vectors among the one or more chiplets of the network comprises:

calculating one or more Message Authentication Codes (MAC) s on the one or more device heartbeat vectors at least in part with a revocation key associated with all of the one or more chiplets;

transmitting the one or more device heartbeat vectors and the one or more MACs throughout the network, wherein a first chiplet of the one or more chiplets transmits to all others of the one or more chiplets a first device heartbeat vector associated with the first chiplet and a first MAC computed on the first device heartbeat vector; and authenticating the transmitted one or more device heartbeat vectors and the one or more MACs, a second chiplet of the one or more chiplets authenticating at least the first device heartbeat vector and the first MAC at least in part with at least one of a status table or the revocation key.

17. A method for detecting and interrupting a cache-based side-channel attack performed with a network of chiplets, the method comprising:

determining one or more device heartbeat vectors of the one or more chiplets, the one or more device heartbeat vectors being derived at least part from one or more measurements of activity of one of more dedicated security processors associated with the one or more chiplets;

determining that a particular chiplet of the one or more chiplets is being attacked with a cache-based side-channel attack, the determining being based at least in part on a computed disparity exceeding the threshold, the computed disparity being computed based at least in part on one or more disparities between at least one or more device heartbeat vectors associated with the particular chiplet and one or more other device heartbeat vectors associated with others of the one or more chiplets; and employing countermeasures against the cache-based side-channel attack of the particular chiplet, the countermeasures including at least revoking one or more access rights of the particular chiplet on the network;

wherein the determining that a particular chiplet of the one or more chiplets is being attacked with a cache-based side-channel attack comprises:

distributing the one or more device heartbeat vectors among the one or more chiplets of the network;

wherein the distributing the one or more device heartbeat vectors among the one or more chiplets of the network comprises:

calculating one or more Message Authentication Codes (MACs) one the one or more device heartbeat vectors at least in part with a revocation key associated with all of the one or more chiplets;

transmitting the one or more device heartbeat vectors and the one or more MACs throughout the network, wherein a first chiplet of the one or more chiplets transmits to all others of the one or more chiplets a first device heartbeat vector associated with the first chiplet and a first MAC computed on the first heartbeat vector; and authenticating the transmitted one or more device heartbeat vectors and the one or more MACs, a second chiplet of the one or more chiplets authenticating at least the first device heartbeat vector and the first MAC at least in part with at least one of a status table or the revocation key.

* * * * *